(12) United States Patent
Dole et al.

(10) Patent No.: US 10,271,512 B2
(45) Date of Patent: Apr. 30, 2019

(54) SEALED GEAR HOUSING AND A HAND-HELD APPLICATOR TO CLEAN TEATS OF A MILK-PRODUCING ANIMAL

(71) Applicant: Alpha Technology U.S.A. Corporation, Longwood, FL (US)

(72) Inventors: Kevin Dole, Longwood, FL (US); Larry Bilskie, Winter Springs, FL (US)

(73) Assignee: ALPHA TECHNOLOGY U.S.A. CORPORATION, Longwood, FL (US)

( * ) Notice: Subject to any disclaimer, the term of this patent is extended or adjusted under 35 U.S.C. 154(b) by 0 days.

(21) Appl. No.: 15/812,338

(22) Filed: Nov. 14, 2017

(65) Prior Publication Data
US 2018/0092328 A1 Apr. 5, 2018

Related U.S. Application Data

(62) Division of application No. 14/689,438, filed on Apr. 17, 2015, now Pat. No. 9,854,781.

(60) Provisional application No. 61/980,864, filed on Apr. 17, 2014.

(51) Int. Cl.
| | | |
|---|---|---|
| *A01J 7/04* | (2006.01) | |
| *F16H 55/17* | (2006.01) | |
| *F16D 1/06* | (2006.01) | |
| *F16D 1/108* | (2006.01) | |

(52) U.S. Cl.
CPC .......... *A01J 7/04* (2013.01); *F16D 1/06* (2013.01); *F16H 55/17* (2013.01); *F16D 1/108* (2013.01)

(58) Field of Classification Search
CPC ........ A01J 7/04; A01J 7/00; A01J 7/02; A01J 7/025
See application file for complete search history.

(56) References Cited

U.S. PATENT DOCUMENTS

| | | | |
|---|---|---|---|
| 1,760,749 | A | 5/1930 | Gillespie |
| 1,870,349 | A | 8/1932 | Taylor |
| 3,026,552 | A | 3/1962 | Price |
| 3,195,537 | A | 7/1965 | Blasi |
| 3,416,386 | A | 12/1968 | Pickles |
| 3,614,900 | A | 10/1971 | Wahlmark |
| 3,648,696 | A | 3/1972 | Keith |
| 3,713,423 | A | 1/1973 | Sparr, Sr. |
| 3,775,800 | A | 12/1973 | Veneziani |

(Continued)

FOREIGN PATENT DOCUMENTS

| | | |
|---|---|---|
| EP | 399132 | 11/1990 |
| EP | 1030549 | 7/2003 |

(Continued)

OTHER PUBLICATIONS

International Search Report, dated Aug. 10, 2015.

(Continued)

*Primary Examiner* — Monica L Williams
(74) *Attorney, Agent, or Firm* — Robert L. Wolter; Beusse Wolter Sanks & Maire, PLLC

(57) ABSTRACT

Embodiments are directed to a sealed gear housing for a hand-held applicator for cleaning a teat of a milk-producing animal. In an embodiment, a first portion of the housing has a plurality of gear holes and a peripherally extending flange surrounding the gear holes. A second portion has a motor mount and having a peripherally extending groove in which the flange of the first portion fits, the first and second portions each have at least one delivery port configured to be coupled to an at least one disinfectant delivery line.

14 Claims, 14 Drawing Sheets

(56) References Cited

U.S. PATENT DOCUMENTS

| | | | |
|---|---|---|---|
| 3,822,479 | A | 7/1974 | Kowalski |
| 3,990,605 | A | 11/1976 | Hanke |
| 4,305,346 | A | 12/1981 | Sparr, Sr. |
| 5,070,567 | A | 12/1991 | Holland |
| 5,211,132 | A | 5/1993 | Farina et al. |
| 5,235,937 | A | 8/1993 | Farina et al. |
| 5,383,423 | A | 1/1995 | van der Lely |
| 5,641,498 | A | 6/1997 | Loosemore |
| 5,809,601 | A | 9/1998 | Rivera |
| 5,951,060 | A | 9/1999 | Fukano |
| 6,123,966 | A | 9/2000 | Kross |
| 6,154,913 | A | 12/2000 | Burton |
| 6,155,204 | A | 12/2000 | van der Lely et al. |
| 6,158,720 | A | 12/2000 | Patrick |
| 6,321,688 | B1 | 11/2001 | Eriksson |
| 6,325,021 | B1 | 12/2001 | Farina |
| 6,343,566 | B1 | 2/2002 | Eriksson |
| 6,379,685 | B1 | 4/2002 | Richter et al. |
| 6,394,038 | B1 | 5/2002 | Eriksson |
| 6,432,010 | B1 | 8/2002 | Palonis |
| 6,524,624 | B1 | 2/2003 | Morelli et al. |
| 6,550,420 | B1 | 4/2003 | Bjork |
| 6,591,784 | B1 | 7/2003 | Eriksson |
| 6,752,102 | B2 | 6/2004 | Dahl et al. |
| 6,935,271 | B2 | 8/2005 | Edison et al. |
| 7,165,510 | B2 | 1/2007 | Hakes |
| 7,178,480 | B2 | 2/2007 | Dahl et al. |
| 7,410,201 | B1 | 8/2008 | Wilson et al. |
| RE41,279 | E | 4/2010 | McSherry et al. |
| 7,882,802 | B2 | 2/2011 | Van Den Berg et al. |
| 8,302,239 | B2 | 11/2012 | Lantsberg et al. |
| 8,322,244 | B2 | 12/2012 | Bucher |
| 8,622,026 | B1 | 1/2014 | Dole |
| 2004/0169168 | A1 | 9/2004 | Pija |
| 2005/0276060 | A1 | 12/2005 | Brazas |
| 2007/0175405 | A1 | 8/2007 | Vecchia |
| 2007/0272787 | A1 | 11/2007 | Jian |
| 2009/0084321 | A1 | 4/2009 | Hiley |
| 2009/0084324 | A1 | 4/2009 | Hiley |
| 2010/0187488 | A1 | 7/2010 | Gargaro |
| 2010/0296861 | A1 | 11/2010 | Pilja |
| 2012/0067288 | A1 | 3/2012 | Dole |
| 2013/0000060 | A1 | 1/2013 | Zhang et al. |
| 2013/0105326 | A1 | 5/2013 | Averbeck et al. |
| 2015/0208605 | A1 | 7/2015 | Dole |
| 2015/0245586 | A1 | 9/2015 | Dole |

FOREIGN PATENT DOCUMENTS

| | | |
|---|---|---|
| FR | 2559351 | 8/1995 |
| WO | 9904623 | 2/1999 |
| WO | 9905904 | 2/1999 |
| WO | 0047041 | 8/2000 |
| WO | 04034775 | 4/2004 |
| WO | 2012104094 | 8/2012 |
| WO | 2013009551 | 1/2013 |

OTHER PUBLICATIONS

Neijenhuis, F. et al., "Relationship Between Teat-End Callosity and Occurence of Clinical Mastitis," J. Dairy Sci., 2001 pp. 2664-2672, vol. 84, No. 12, Am. Dairy Sci. Assoc.

Dube, B et al., "Genetic Analysis of Somatic Cell Score and Udder Type Traits in South African Holstein Cows," Sth. Afric. Journ. of Anim. Sci., 2008, pp. 1-11, vol. 38, No. 1.

Oliver et al., "Prevention of Bovine Mastitis by a PreMilking Teat Disinfectant Containing $HClO_2$ & $ClO_2$," Journ. of Dairy Sci., Am. Dairy Science, vol. 76, No. 1, Jun. 1, 1993, 287-292.

Coates, D., "An Evaluation of the Use of Chlorine Dioxide (Tristel One-Shot) in an Automated Washer/Disinfector," Journal of Hospital Infection, vol. 48, No. 1, May 1, 2001.

Dairy Vet, "Managing My Herd," Herd Management, pp. 4, Mar. 2007.

Ahn, "Product News," pp. 14, Sep./Oct. 2004.

Farmers Guardian, "Tacking High Cell Counts Head on in the Parlour," Dairy Health, pp. 74-75, Feb. 2, 2007.

Tractor & Machinery Showcase, "Dairy Supplies," pp. 47, Nov. 2006.

Oliver et al., "Prevention of Bovine Mastitis by a PostMilking Teat Disinfectant Containing Chlorous Acid and Chlorine Dioxide in a Soluble Polymer," Journ. of Dairy Sci., vol. 72, No. 1, 1989, 3091-3097.

Dreschsler, P.A., et al., "Evaluation of a Chlorous Acid-Chlorine Dioxide Teat Dip Under Experimental and Natural Exposure Conditions," Journ of Dairy Sci, vol. 73 1990, 2121-2128.

Boddie, R.L., et al., "Efficacy of Two Barrier Teat Dips Containing Chlorous Acid Germicides Against Exeperimental Challenge with *Staphylococcus aureus* an *Streptococcus agalactiael*," Journ of Dairy Sci, vol. 77, 3192-3197.

Boddie, R. L., et al., "Germicidal Activity of a Chlorous Acid-Chlorine Dioxide Teat Dip and a Sodium Chlorite Teat Dip During Experimental Challenge with *Staphylococcus aureus* and *Streptococcus agalactiae*," Journ of Dairy Sci, vol. 81, 1998, 2293-2298.

Boddie, R.L., et al., "Efficacies of Chlorine Dioxide and Lodophor Teat Dips During Experimental Challenge with *Staphylococcus aureus* and *Streptococcus agalactiae*," Journ of Dairy Sci, vol. 83, 2000, 2975-2979.

Nickerson, S.C., "Choosing the Best Teat Dip for Mastitis Control and Milk Quality, NMC-PDPW Milk Quality Conference Proceedings," Apr. 2001, p. 43.

Lin, Maw-Yeong, et al."Germicidal Activity and Chicken Toxicity of Chlorine Dioxide," Taiwan Vet J 34, 2008, 142-148.

Tims, Leo L. "Evaluation of a Novel Chlorine Dioxide Teat Dip on Teat End and Teat Skin Health," Animal Industry Report, 2008, 159-164.

Zaninelli, M., et al., "Evaluation of Teat Cleaning Bymechanical Device Correlated with Intramammary Infection, Somatic Cell and Total Bacteria Count," NMC Annual Meeting Proceedings, 2005, p. 303.

Rao, Madduri V., et al. "Acidified Sodium Chlorite (ASC) Chemical and Technical Assessment," 2007 pp. 1-12.

SEALED GEAR HOUSING AND A HAND-HELD APPLICATOR TO CLEAN TEATS OF A MILK-PRODUCING ANIMAL

CROSS-REFERENCE TO RELATED APPLICATIONS

This application is a divisional of U.S. Ser. No. 14/689,438 filed on Apr. 15, 2015 and claims the benefit of U.S. Provisional Application No. 61/980,864 filed Apr. 17, 2014, both of which are incorporated herein by reference in their entirety.

BACKGROUND

Embodiments herein relate to systems and methods that are used for cleaning teats of milk producing animals. More specifically, the embodiments pertain to a threaded gear assembly and a hand-held applicator used in those systems that utilize disinfectant applicators to a supply of disinfectant solution for cleaning the teats of a milk-producing animal.

Systems are available that utilize rotating brushes in combination with a cleaning solution to clean teats. One such system is disclosed in U.S. Pat. Nos. 8,402,920 and 8,555,811 and assigned to the assignee of the instant application. Such systems may include hand-held applicators having three rotating brushes, two of which rotate to scrub/clean a base of the teat, and a third brush which is arranged to scrub/clean a tip of the teat. The applicators are in communication with a disinfectant source, which is supplied to the applicators as the brushes are rotating and scrubbing the teats. The applicators may be remotely operated relative to the solution source.

These teat cleaning systems also include a motor that is typically suspended from an elevated position and a flexible drive shaft extends from the motor to the hand-held applicators. The flexible drive shaft is operatively connected to gears, which in turn are operatively connected to the brushes to rotate the brushes during teat cleaning operations.

A pair of the brushes which clean the teats are aligned to provide a path to direct the teat between the bristles of the brushes. The liquid properties of the cleaning solution may allow such debris and solution to seep into the gear housing causing a buildup of debris. The brushes rotate by a mated connection between the base of the brush and a gear. As the debris builds around the gear and base of the brushes, wear begins to effect the performance of the rotation of the brushes. In some instances, the brushes may begin to wobble. The wobble may progress such that the comfort to the teats of the milking producing animal may diminish, thus effecting the teat stimulation, overall teat health and milk production. In addition, the flexible drive shaft has been viewed as ergonomically restrictive because it is relatively heavy and when used during cleaning over an extended period of time tires an operator.

Milk production may be optimized with proper teat stimulation and cleaning. Improper cleaning can cause the milk to be contaminated requiring additional processing or in some instances discard of the milk. Milk-producing animals, such as cows, may be milked several times a day to increase production. Thus, care is taken to prevent teat injury or infection. Teat stimulation of a milk-producing animal is a precursor for oxytocin release and letdown. Hence, preventing teat injury and discomfort during the washing and drying cycle may be important to the overall stimulation of the teat for milk production quantities.

SUMMARY

Embodiments are directed to a threaded gear assembly and a hand-held applicator for cleaning a teat of a milk-producing animal. A threaded gear is provided which comprises a disk-shaped member having a perimeter and a plurality of radiating teeth circumferentially arranged and integrated with the perimeter of the disk-shaped member, the plurality of radiating teeth being configured to impart torque. The threaded gear includes a bore hole in a center of the disk-shaped member, the bore hole including internal threading along a surface within the bore hole.

Another aspect of the embodiments include a threaded gear and part assembly comprising at least two gears with radiating teeth and being in mechanical drive communication with each other and one of which has a centered bore hole having internal threading along a surface of the gear in the bore hole. The threaded gear and part assembly also includes a part having a shaft portion with external threading corresponding to the internal threading of the gear and the gear is rotated in a first direction or the part is rotated in a different second direction for threaded engagement between the gear and the part. In operation of the gear, the gear rotates in the first direction to impart a torque onto the part to rotate the part in the first direction.

A further aspect of the embodiments includes a hand-held applicator of a system for cleaning teats of a milk-producing animal, the hand-held applicator comprising a housing having an internal volume within which a plurality of brushes are positioned for engaging a teat of the milk-producing animal having been inserted in the volume for cleaning; and a gear assembly including a plurality of gears. Each gear comprises a disk-shaped member having a perimeter; a plurality of radiating teeth circumferentially arranged and integrated with the perimeter of the disk-shaped member, the plurality of radiating teeth being configured to impart torque on an adjacent gear; and a bore hole in a center of the disk-shaped member. The bore hole includes internal threading along a surface within the bore hole wherein each gear is operatively connected to a respective brush. Each brush comprises a shaft portion with external threading corresponding to the internal threading of a corresponding gear. Each gear is rotated in a respective first direction or each brush is rotated in a respective second direction for threaded engagement between a gear and corresponding brush. A respective second direction for one brush is opposite to a respective second direction of another brush. In operation of the hand-held applicator, each gear rotates in its respective first direction to impart a torque onto the brush to rotate each brush in the respective first direction.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

The embodiments involve components and processes similar to the System And Method for Cleaning Teats of A Milk-Producing Animal, disclosed in U.S. Pat. No. 8,402,920, filed on Sep. 16, 2010, and assigned to the assignee of the instant application, which is incorporated herein by reference in its entirety as if set forth in full below.

A more particular description of the embodiments briefly described above will be rendered by reference to specific embodiments thereof that are illustrated in the appended drawings. Understanding that these drawings depict only typical embodiments and should not therefore to be considered to be limiting of its scope, the embodiments will be described and explained.

Figure 1:
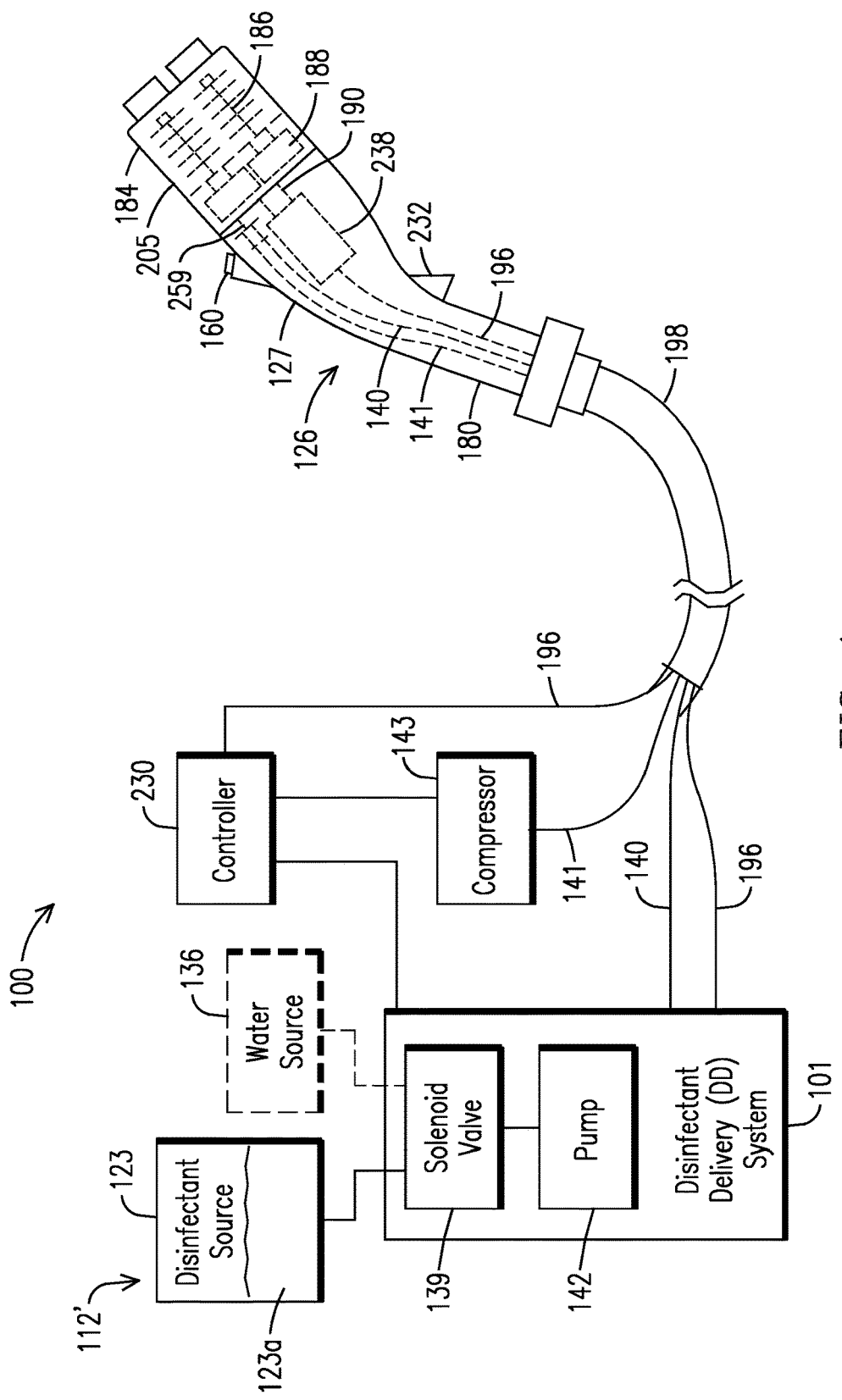
FIG. 1 illustrates a schematic diagram of a system for cleaning teats.

With respect to FIG. 1, a schematic illustration of a system 100 for cleaning teats of a milk-producing animal is shown. As shown, the system 100 may be configured to deliver a disinfectant via a remote station 112' to one or more hand-held applicators 126 positioned in a milking parlor and to clean the teats of a milk producing animal. The remote station 112' may comprise one or more of a disinfectant source 123, a disinfectant delivery (DD) system 101, a controller 230 and compressor 143 in communication with a hand-held applicator 126 by a flexible cable 198. The remote station 112' is in fluid flow communication with one or more hand-held applicators 126, each of which may be connected to a respective flexible cable 198. The DD system 101 may include one or more solenoid valves 139 and at least one pump 142, for delivery of the solution to the hand-held applicator via delivery line 140 as will be described in more detail later. In an embodiment, the pump may include a fluid driven pump or electrical pump. As further shown in FIG. 1, DD 101 may be connected to water source 136 to dilute a concentrated form of a disinfectant solution, in which case the DD 101 may require one or more valves 139, such as solenoid valves, to control the flow of water to the hand-held applicator 126. It is contemplated that the system 100 may be used with a "ready-to-use" solution, which may not require access to a water source for dilution purposes.

The disinfectant source 123 may comprise a container with a disinfectant 123a. By way of a non-limiting example, the disinfectant 123a may be aqueous disinfectant solution. The aqueous disinfectant solution may comprise aqueous chlorine dioxide. In an embodiment, the aqueous disinfectant solution may have a vapor pressure or viscosity substantially equal to that of water. However, the embodiments are not so limited. The embodiments disclosed herein may include other disinfectants including, but not limited to, other chlorine containing or chlorine based solutions, or any other disinfectant that is effective in sanitizing teats of milk-producing animals. The "Summary of Peer-Reviewed Publications on Efficacy of Premilking and Postmilking Teat Disinfectants Published Since 1980" is published annually by the National Mastitis Council (NMC) and provides a variety of teat disinfectants and the efficacy.

Figure 2:
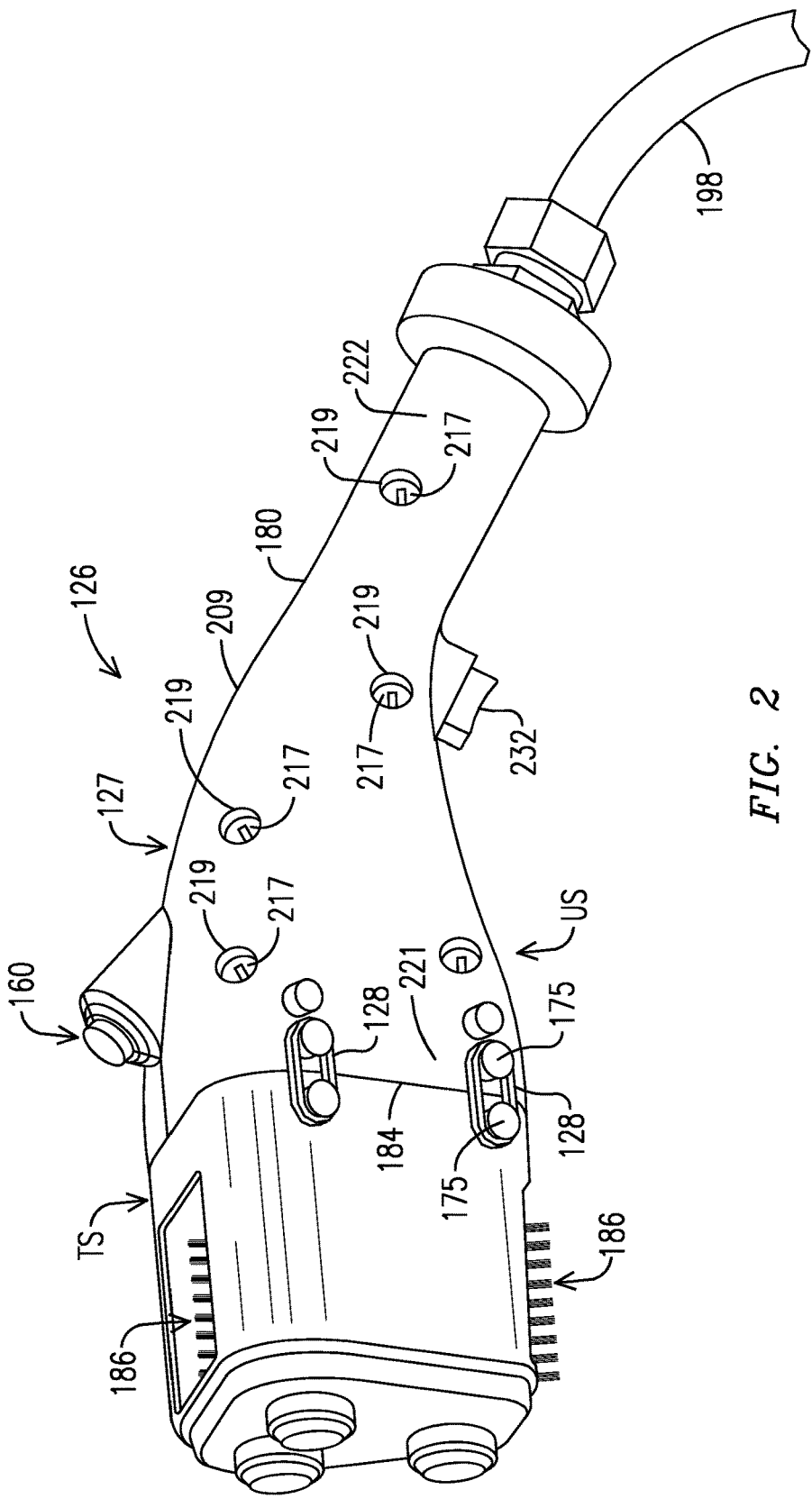
FIG. 2 illustrates a perspective view of the hand-held applicator.

Referring also to FIG. 2, a perspective view of the hand-held applicator 126 is illustrated. The hand-held applicator 126 may comprise an applicator housing 127 with a handle 180. The housing 127 may comprise a brush cover 184. The applicator 126 may comprise an internal direct drive motor 238 (FIG. 1) coupled to a separate sealed gear housing 205, both of which are housed in the housing 127. The sealed gear housing 205 will be described in more detail below. The motor 238 (FIG. 1) may include drive shaft 190 (FIG. 1) adapted to rotate a plurality of brushes 186 in the brush cover 184 via gears 188 (FIG. 1) upon activation of switch 232. The applicator 126 may include a light source 160 which may be activated upon actuation of the switch 232.

The cable 198 may comprise a flexible and insulated integrated cable. The integrated cable 198 may include at least one disinfectant delivery (DD) line 140, at least one air line 141 and at least one electrical line 196. One end of the flexible cable 198 is coupled to the handle 180 of the applicator 126. The DD and air lines 140, 141 may be composed of neoprene or santoprene, having an inside diameter of about 0.17 inches. In an embodiment, the at least one DD line 140 and at least one air line 141 may be bundled together into a single tubing, as will be discussed in further detail later. The cable 198 may alternately omit one or more lines including the at least one air line 141.

Figure 11:
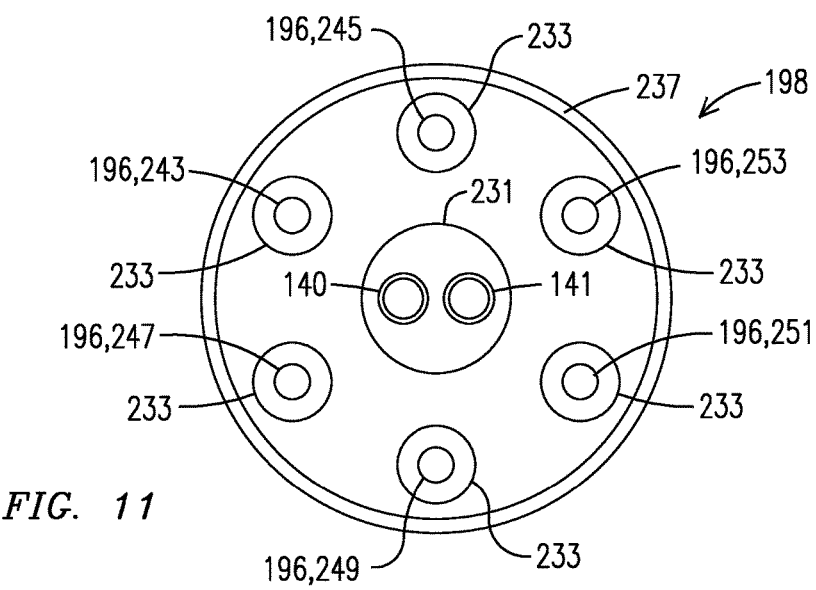
FIG. 11 illustrates a schematic view of the integrated cable.

FIG. 11 illustrates a schematic of the integrated cable 198. The integrated cable 198 may include a center opening 231 which may receive the DD line 140 and air line 141. The cable 198 may include a plurality of openings 233 to receive the at least one electrical line 196. The plurality of openings 233 are spaced around the center opening 231. The plurality of openings 233 are arranged between the center opening 231 and an outer insulated casing 237 of the integrated cable 198. The central opening 231 may correspond to a single tubing for the at least one DD line 140 and the at least one air line 141. Alternately, the cable 198 may omit the at least one air line 141.

Referring still to FIG. 11, the at least one electrical line 196 may include first and second electrical lines 243, 245 configured as a current line and a ground line for the switch 232 of the applicator 126. The at least one electrical line 196 may include third and fourth electrical lines 247, 249 configured as a current line and a ground line for the motor 238 of the applicator 126. The at least one electrical line 196 may include an input signal line 251 to receive a signal from the switch 232. The at least one electrical line 196 may include a light signal line 253 to provide current to a light source 160 on the applicator 126 which may be activated upon pressing the switch 232.

In an embodiment, the integrated cable 198 may include 2-16 AWG (American wire gauge) and 5-18 AWG electrical conductors surrounding the center opening 231. The center opening 231 may have an inner diameter of approximately ¼", and the outer diameter of the cable 198 may be approximately 0.65". However, these specific dimensions and conductor wiring arrangements are merely one example of how the integrated cable 198 may be assembled and the integrated cable 198 is not limited to these specific dimensions and conductor arrangements, provided that the integrated cable 198 is capable of communicating air, disinfectant and electrical signals to the applicator 126.

Returning again to FIG. 1, the system 100 may be configured to have a washing cycle and a drying cycle. The washing cycle and drying cycle removes debris and other contaminants and may cause teat stimulation required for milk letdown by the milk-producing animal. During the washing cycle, the disinfectant 123a may be delivered on DD line 140 into the brush cover 184 in the direction of the brushes 186 and toward the teat. Also during the washing cycle, the brushes 186 may rotate.

During the drying cycle, the delivery of the disinfectant 123a may be discontinued by the DD system 101. However, during the drying cycle, the brushes 186 may continue to rotate; an air stream on the air line 141 may be delivered into the brush cover 184 in the direction of the teat and brushes 186; or a combination of rotating brushes 186 and delivery of the air stream in air line 141 may be performed.

The washing cycle will now be described in more detail. During the washing cycle, the controller 230 may control the DD system 101 to deliver a supply of disinfectant 123a to the hand-held applicator 126. Alternately, the DD system 101 may be initiated by the operation of the switch 232 via line 196 shown in dashed lines. The dashed lines represent an optional function.

The DD system 101 may activate the one or more of solenoid valves 139 and/or the at least one pump 142 for delivery of an amount of the disinfectant 123a to the applicator 126 on DD line 140. In addition, the controller 230 may be programmed to control the operation of the DD system 101 upon activation of switch 232 to activate the solenoid valve 139 and/or pump 142.

When the disinfectant (concentrated) is being delivery or siphoned from the disinfectant source 123, the disinfectant may be mixed with a fluid or water from water source 136 to dilute the disinfectant to the predetermined solution ratio. The solenoid valve may perform one or more of turn on, shut off, dosing, distribution or mixing. Alternately, the DD system 101 may mix or hydrate a non-aqueous disinfectant with fluid or water from water source 136.

During the washing cycle, the rotation of the brushes 186 may be started coincident with delivery of the disinfectant 123a to the applicator 126 for delivery into the brush cover 184, such as, without limitation, upon activation of switch 232. Furthermore, during the drying cycle, the controller 230 may be programmed to initiate transmission of compressed air to the applicator 126. The compressed air may be controlled to direct air toward the teat and may assist in drying the cleaned teat. The compressed air may also be injected toward the teat to assist in loosening dirt, drying the disinfectant of the aqueous type or lifting/removal of the non-aqueous disinfectant from the teat skin. The separation of dirt, lifting and/or drying of the disinfectant may also be a function of gravity acting on the dirt and/or disinfectant.

The air may also lift away adhering dirt on the bristles of the brushed between teat cleaning. The lifted dirt from the brushes may also exit the applicator housing 127 by the force of gravity. The air may also serve to dry the interior surfaces of brush cover 184. For example, while walking between animals or at the end of the day, a drying cycle may be used to apply air within the brush cover 184.

As shown in FIG. 1, the pump 142 may be configured to pump the disinfectant 123a from the disinfectant source 123 in at least one disinfectant delivery (DD) line 140. As further shown in FIG. 1, the compressor 143 is configured to deliver compressed air via air line 141 in response to controller 230. In an embodiment, the DD line 140 and the air line 141 may be coupled to a coupler 259, such as a Y-coupler, so that the disinfectant or the air stream flows through the coupler 259, alternately but not simultaneously. Furthermore, while the switch 232 remains depressed or in a first switch state, the DD system 101 may remain active and the communication of the disinfectant 123a in the DD line 140 may continue for a predetermined time under the control of controller 230 or until the switch 232 changes states. The first switch state may correspond to an ON position of the switch 232 and a second switch state may correspond to an OFF position. By way of non-limiting example, the switch when pressed is in the ON position or in the first switch state. Upon release of the switch 232, the switch 232 may be in the OFF position or in a second switch state. Additionally, during the drying cycle, the controller 230 may be coupled to the compressor 143 to initiate a transmission of compressed air from the compressor 143 along the air line 141. The compressor may be activated during a drying cycle under the control of the controller 230, to deliver air to the applicator 126.

In an embodiment, the controller 230 may be programmed such that when the switch 232 is be depressed or actuated, the input signal line 251 may transmit a signal from the switch 232 to the controller 230. In response, the disinfectant 123a may then be delivered from the disinfectant source 123 by the DD system 101 to a volume within the applicator 126. The volume may include the brush cover 184. Additionally, in response to the switch 232 being depressed or actuated, the compressed air may be delivered from the compressor 143 to the volume within applicator 126 occupied by the brushes 186. Additionally, the electrical signals may be delivered along the electrical lines 196 to the direct drive motor 238, switch 232 and light source 160 in the applicator 126. As long as the switch 232 is actuated, the disinfectant may be delivered to the applicator 126 and the brushes 186, which may be rotating. The controller 230 may be programmed so that when the switch 232 may be released, the DD system 101 may be deactivated.

Although the above embodiment discusses that the controller 230 controls transmission of one or more of the disinfectant 123a, the compressed air and the electrical signals while the switch 232 may be pressed, the embodiment is not limited to this configuration and an alternate switch embodiment may be provided in which the controller 230 controls transmission of the disinfectant 123a, when the switch 232 is pressed and released, for a predetermined time, after which the DD system 101 is deactivated, for example.

The controller 230 may be programmed with a delay so that brushes 186 continue to rotate for a predetermined time duration after the delivery of the disinfectant 123a has been discontinued. In an embodiment, the time delay may be about 4 to about 7 seconds so that the rotating brushes 186 may be used to partially dry teats after the application of the disinfectant 123a. In an embodiment, the controller 230 may be programmed such that during the delay, the brushes 186 continue to rotate and the compressor 143 delivers compressed air through the air line 141 to the applicator 126 so that the compressed air and the rotating brushes 186 may be used to dry the teats after the application of the disinfectant 123a. Although the above embodiment discusses the switch 232 with a trigger design, in which the switch 232 is actuated based on being pressed, the switch is not limited to this design and may include a non-contact proximity switch positioned within the housing 127, which is sealed inside the housing 211, thus preventing water intrusion.

One or more hand-held applicators 126 are positioned within the milking parlor to clean and disinfect teats of a plurality of milk-producing animals such as cows that have been herded into the parlor for milking. The hand-held applicator 126 will now be described in more detail below.

Figure 3A:
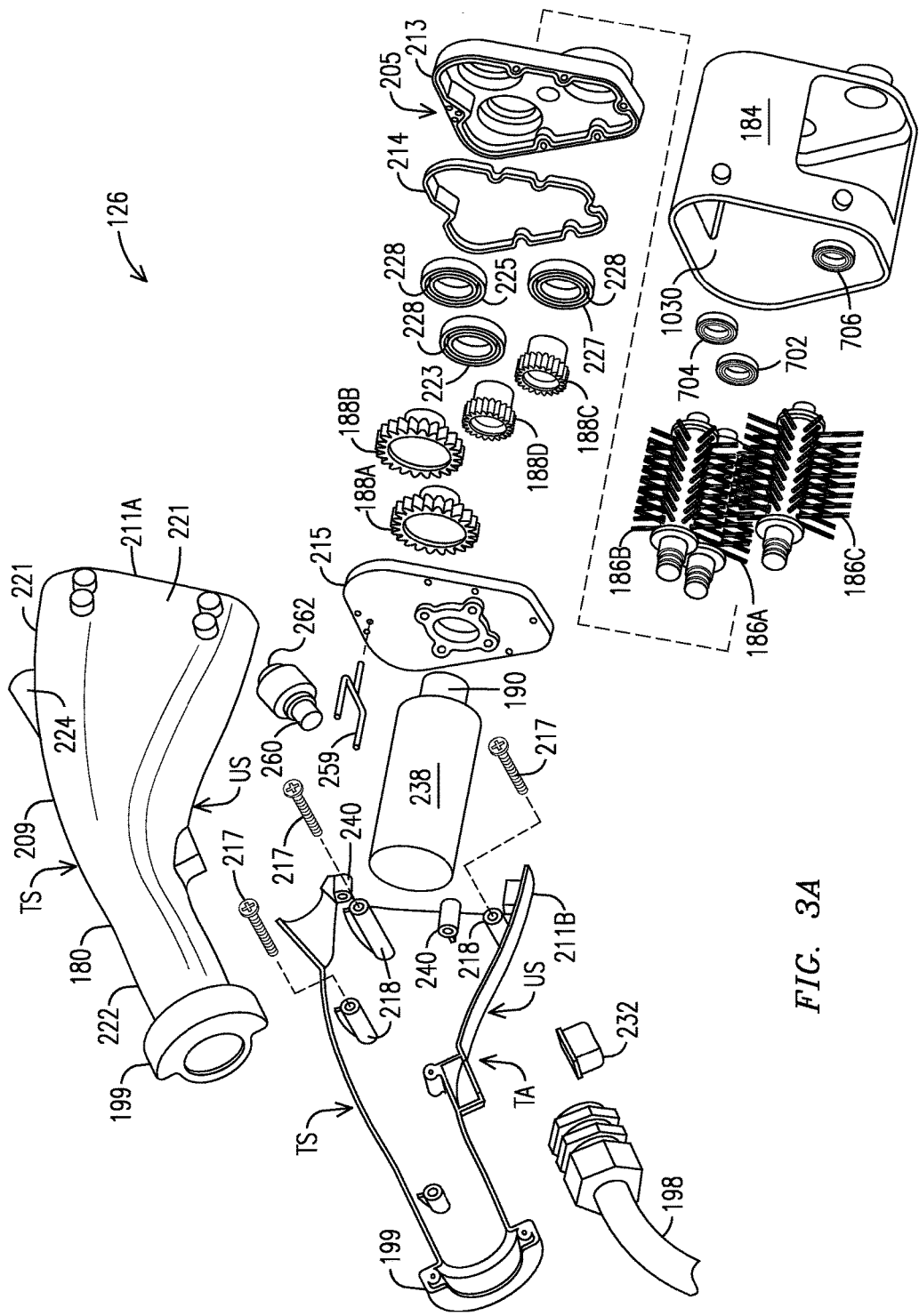
FIG. 3A illustrates an exploded view of the hand-held applicator of FIG. 2.
Figure 15:
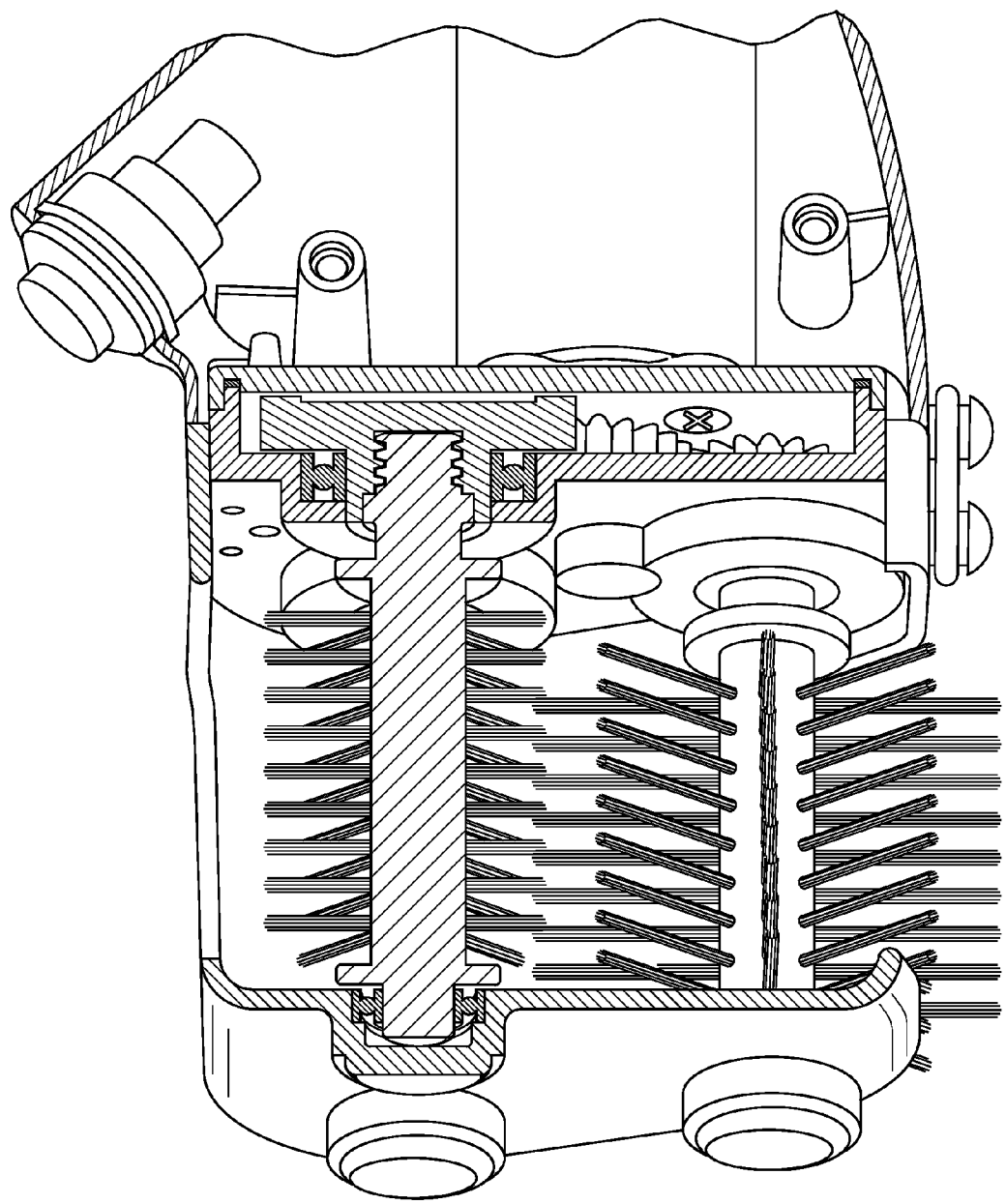
FIG. 15 illustrates a partial view of the hand-held applicator with portions of the brush cover, housing section and sealed gear housing cut away.

Referring also to FIG. 3A, an exploded view of the hand-held applicator 126 of FIG. 2 is illustrated. As best seen in FIG. 3A, the applicator housing 127 (FIG. 2) may include the brush cover 184 for the brushes 186A, 186B, 186C (as best seen in FIGS. 7, 9 and 13A-13B) and a housing section 209 for the internal direct drive motor 238. The separate sealed gear housing 205 is configured to house the gears 188A, 188B, 188C, and 188D (as best seen in FIG. 8). The brush cover 184, housing section 209 and sealed gear housing 205 may be connected together to form the applicator housing 127 with the sealed gear housing 205 being configured with an internal sealed gear chamber 216 (FIG. 15). The housing section 209 may include a top side TS and an underside US. The brush cover may be coupled by a strap, tie or tethering member 128 (FIG. 2) with the housing section 209. By way of non-limiting example, the tethering member 128 may include a resilient rubber band with elasticity to keep the housing sections together such as by urging the brush cover 184 and the housing section 209 toward each other under an elastic force or compression force created by the elastic properties of the tethering member 128. Removing the resilient rubber band may provide a quick disconnect for cleaning and removing of the brushes and housing sections. A rubber band type tethering member is but one example. Alternately, a strap may be used with eyelets on distal ends that could be slipped over at least one pillars 175 wherein the strap would strap together the brush cover 184 and the housing section 209 so that the faces of the brush cover 184 and the housing section 209 are juxtaposed and/or may be in surface-to-surface contact.

The at least one pillars 175 may be position in proximity to the faces of the brush cover 184 and the housing section 209.

By way of non-limiting example, in a further embodiment, the coupling of the brush cover 184 and the housing section 209 may include other fastening means.

The housing section 209 may include a forward section 221 dimensioned to receive therein the sealed gear housing 205 and the motor 238. A rear end of the forward section 221 of the housing section 209 is integrated with a handle section 222 of the housing section 209. The handle section 222 may taper rearward in a downward direction. As the housing section 209 tapers, the circumference of the housing section 209 may gradually narrow. The gradually tapering and narrowing circumference section (hereinafter referred to as the "handle section 222") may serve as the handle 180 such that a user may grasp the handle 180 during operation. The handle section 222 may terminate at cable connector 199.

For simplicity of illustration, the at least one DD line 140, the at least one air line 141 and the at least one electrical line 196 have been omitted from FIG. 3A.

The housing section 209 may include a bend or curvature along the underside US created at a transition TA from the forward section 221 to the handle section 222. In an embodiment, at the transition TA an angle may be created between the forward section 221 and the handle section 222 along the underside US. As illustrated, the angle between the forward section 221 and the handle section 222 may form an obtuse angle. As can be appreciated, other angles may be used such as, without limitation, a right angle. The switch 232 is positioned along the underside US of the housing section 209 at or in proximity to the transition TA from the forward section 221 to the handle section 222.

As best seen in FIG. 3A, the housing section 209 comprises first and second housing parts 211A and 211B. The first and second housing parts 211A and 211B are configured to be fastened together via a plurality of fasteners 217. The first and second housing parts 211A and 211B are mated together to form a unitary housing structure.

The first and second housing parts 211A and 211B may include fastener holes 219 (FIG. 2) for receipt of fasteners 217. The fasteners may be coupled to fastening members 218. In an embodiment, the fastening members 218 may include threaded channels and the fasteners 217 may include screws. As the screws are threaded into the fastening members 218, the fasteners 217 may secure the first and second housing parts 211A and 211B together. As can be appreciated, unscrewing the fasteners may allow the first and second housing parts 211A and 211B to be separated so that internal components in the applicator 126 may be accessed. Hence, the internal components housed within the housing section 209 may be removed, replaced, and/or cleaned, as necessary.

The cable connector 199 includes a collar which may be sectioned in half between the first and second housing parts 211A and 211B. Additionally, the collar section 199 on first housing part 211A includes a ring. The collar sections 199 on the first and second housing parts 211A and 211B may be fastened tighter.

In other embodiment, the housing section 209 may be unitary but provide an access port so that one or more of the internal components may be removed, replaced and/or cleaned.

Figure 3B:
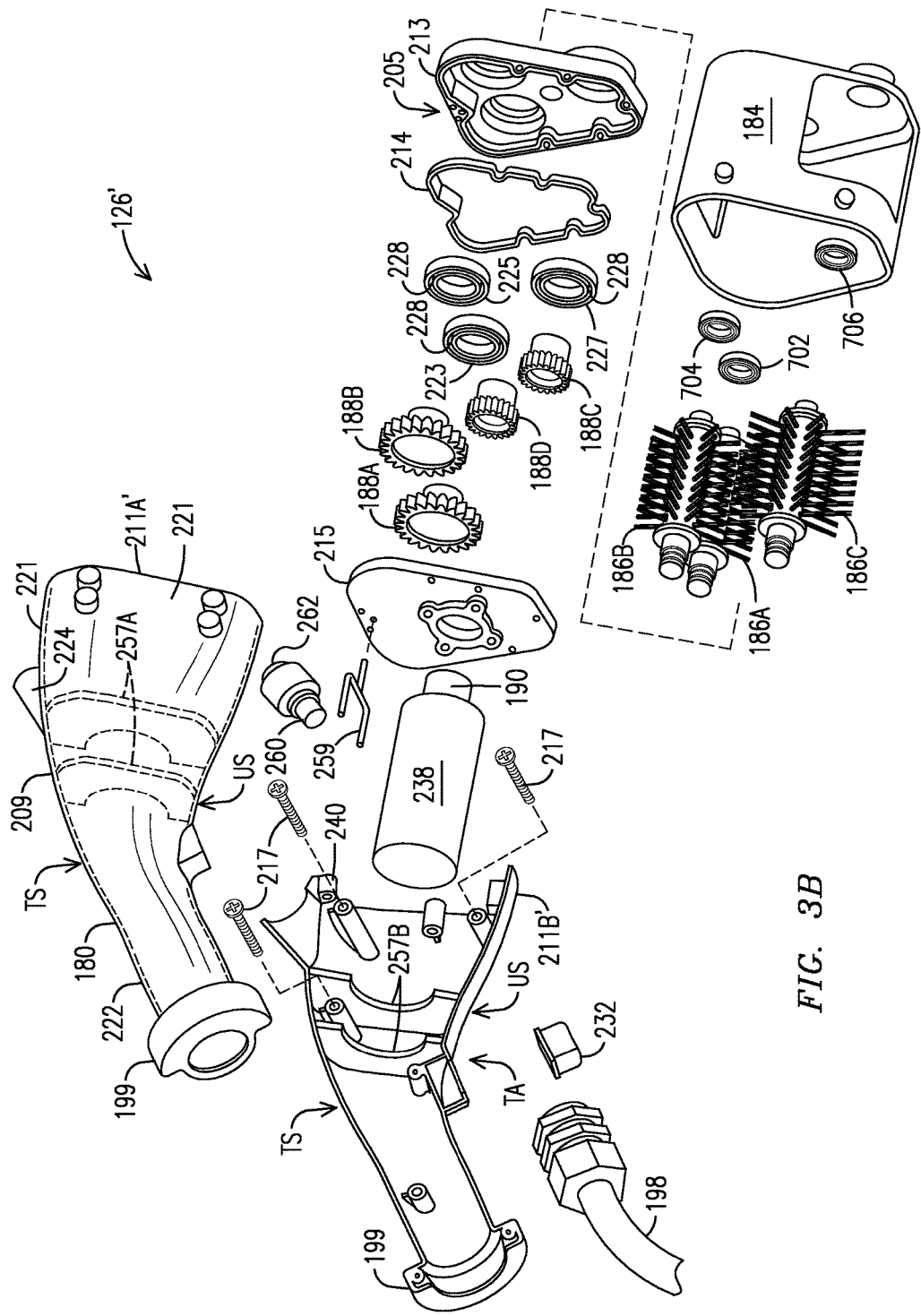
FIG. 3B illustrates an exploded view of the hand-held applicator of an alternate embodiment.

The housing section 209 may include a plurality of fastening members 240 (FIG. 9) positioned on the first and second housing parts 211A and 211B about the opening into the forward section 221 at locations that may align with corresponding holes 578 (FIG. 5A) in the sealed gear housing 205, to be described below. The separate sealed gear housing 205 may be fastened in the housing section 209 with threaded screws (not shown) that may be threaded within the fastening members 240. In an embodiment, some of the fastening members (not shown) may be integrally formed in the first housing part 211A and others of the fastening members 240 may be integrally formed in the second housing part 211B. For simplicity of illustration, the fasteners for fastening members 240 are not shown. The fasteners for fastening Referring now to FIG. 3B, an exploded view of the hand-held applicator 126' of an alternate embodiment is illustrated. FIG. 3B is similar to FIG. 3A. Hence, only the differences will be described. In the embodiment of FIG. 3B, the first and second housing parts 211A' and 211B' include one or more ribs 257A and 257A, respectively. The ribs are concaved and configured such that when the first and second housing parts 211A' and 211B' are mated together, the motor 238 is cradled within the one or more ribs 257A and 257B. In an embodiment, the configuration of the one or more ribs may clamp around the housing of the motor 238'. The clamping feature stabilizes the motor 238'.

Figure 4:
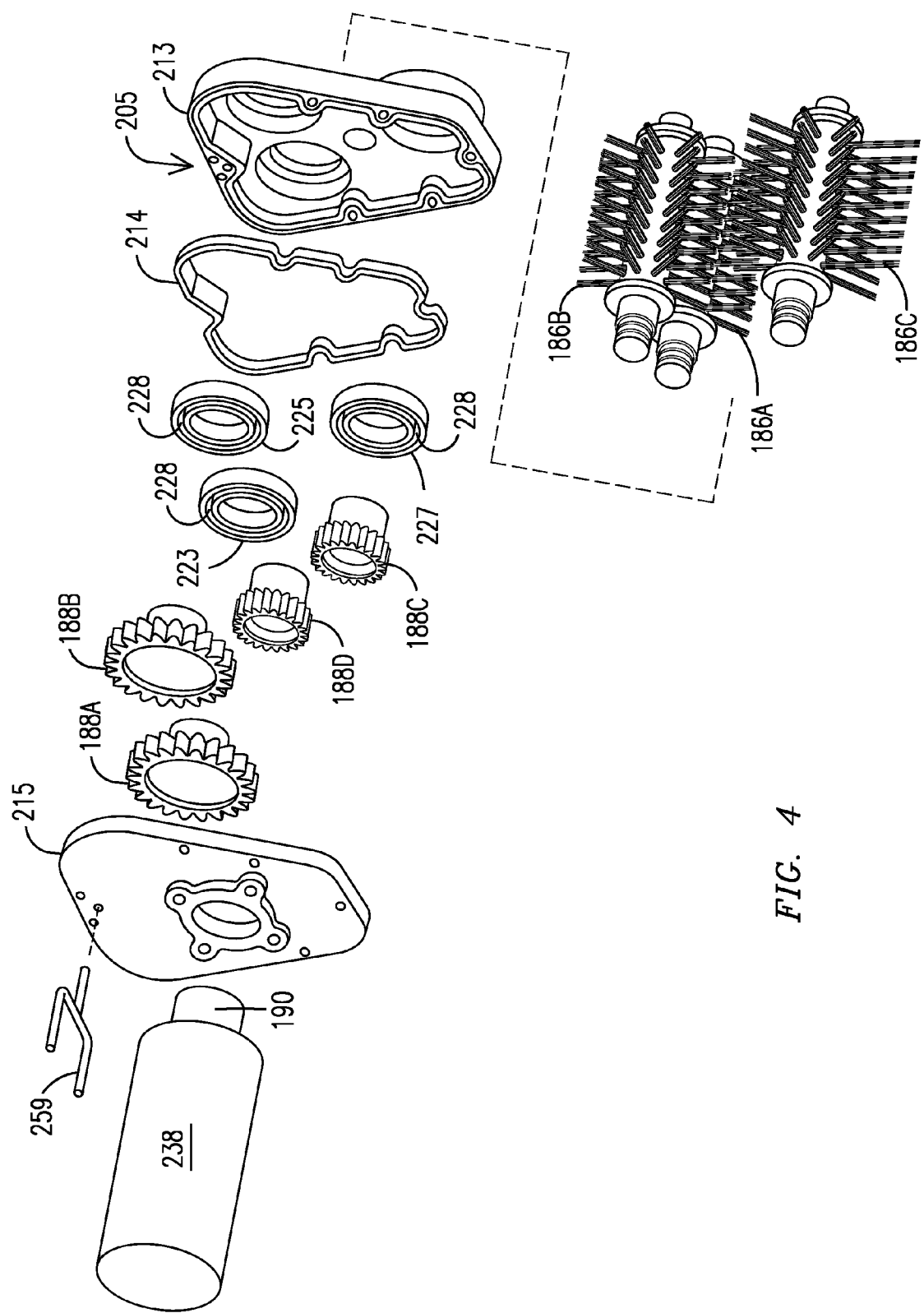
FIG. 4 illustrates a partial exploded view of the sealed gear housing, gears and motor.

The separate sealed gear housing 205 will now be described in further detail in relation to FIGS. 4, 5A, 5B, 6A and 6B. FIG. 4 illustrates is a partial exploded view of the sealed gear housing, gears and motor. As illustrated in FIG. 4 and FIG. 15, the sealed gear housing 205 may include a first gear housing portion 213 and a second gear housing portion 215 that are positioned in abutting engagement to be connected together in a manner which forms an internal sealed gear chamber 216, as best seen in FIG. 15.

Figure 5A:
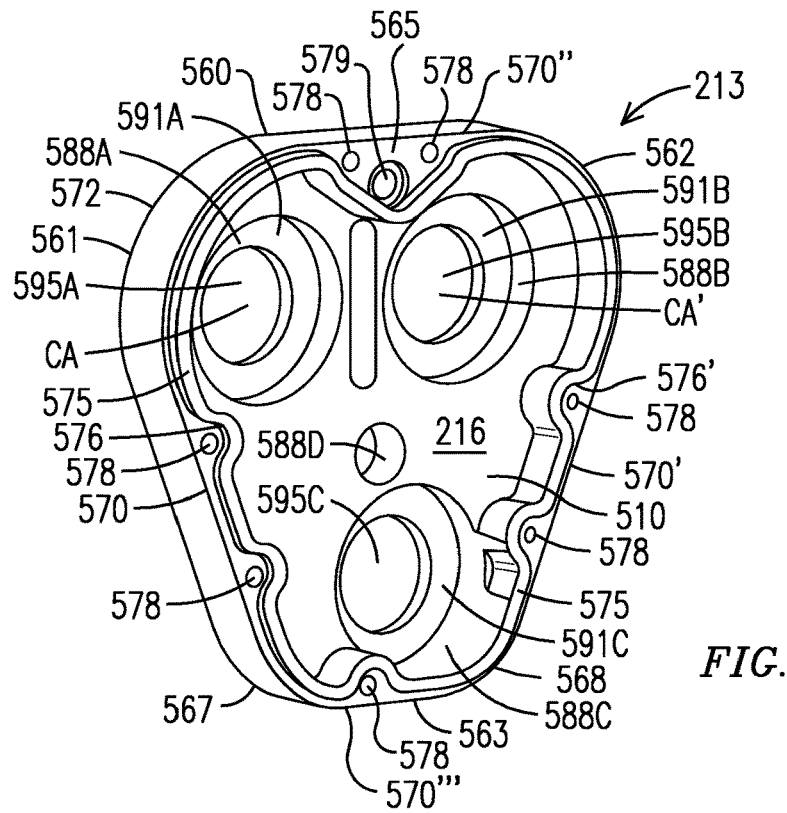
FIGS. 5A and 5B illustrate first and second side perspective views of a first gear housing portion.
Figure 5B:
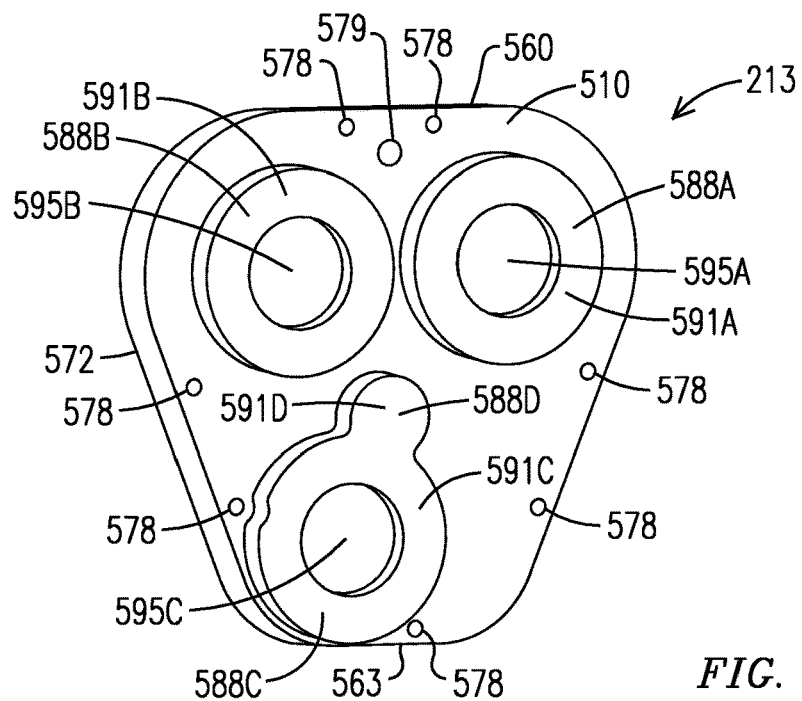

FIGS. 5A and 5B are first side and second side views of the first gear housing portion 213. The first side view of the first gear housing portion 213 corresponds to an interior side of the sealed gear housing 205. The second side view of the first gear housing portion 213 corresponds to an exterior side of the sealed gear housing 205. The interior side may be disposed within the internal sealed gear chamber 216.

The first gear housing portion 213 includes a base 510 having plurality of recesses 588A, 588B, 588C and 588D formed therein. As can be seen from the second side view of FIG. 5B, the recesses 588A, 588B, 588C and 588D protrude past the plane of base 510. The recesses 588A, 588B and 588C having a depth profile to cradle therein bearings 223, 225 and 227, respectively. Each of recesses 588A, 588B and 588C may have an aperture 595A, 595B and 595C formed in surfaces 591A, 591B and 591C, respectively. The aperture 595A, 595B and 595C may be smaller in diameter than the entrance at the base 510 into the recesses. Recesses 588A and 588B may be arranged side by side such that the centers of the recesses may be aligned in the same plane. Recess 588C may be arranged below recesses 588A and 588B. The recess 588D may support therein the drive shaft 190. The recess 588D may include surface 591D which may be generally solid with no apertures. The recess 588D may be below the recesses 588A and 588B and above recess 588C. The recesses 558A, 558B and 558C may be generally circular.

Each bearing 223, 225 and 227 may include recessed channels 228. The recessed channel 228 may receive a sealing member (not shown) so the bearing to gear coupling is sealed. By way of non-limiting example, the sealing member (not shown) may be an O-ring. Each of the bearings 223, 225 and 227 may have a recessed channel on both sides of the bearing to support therein a sealing member in each recess.

With specific reference to FIG. 5A, the base 510 may include a side wall ledge which may be continuous about the perimeter 572. The side wall ledge may include side wall ledge segments 570, 570', 570" and 570''' which may include a flange 575 to mate with the second gear housing portion 215 in an abutting mated arrangement, as best seen in FIG. 15. The side wall ledge segments 570, 570', 570" and 570''' may comprise holes 578 for the attachment of fasteners (not shown) to fasten the first and second gear housing portions 213 and 215 together. The holes 578 being on the exterior side of the sealed gear chamber 216. The area within the flange 575 when the first and second gear housing portions 213 and 215 are secured may serve as the sealed gear chamber 216. The side wall ledge segment 570" extends across the base end 560 and may include hole 579. Hole 579 may be configured to receive DD line 140 and/or air line 141. As can be appreciated, the at least one DD line 140 may be attached to the sealed gear housing 205 at a location which may be outside the sealed gear chamber 216. The side wall ledge segment 570''' may extend across the truncated apex 563. In an embodiment, the at least one DD line 140 and the at least one air line 141 may both be received in hole 579. Nonetheless, the air line 141 may be passed through any of holes 578. The hole 579 may serve as a delivery port for insertion of the disinfectant or air. The coupler 259 is coupled to hole 579 and 679 wherein disinfectant or air is communicated to the brush cover 184 through coupler 259.

With specific reference of FIG. 5B, in an embodiment, the exterior side may be configured to allow for disinfectant run-off within the brush cover 184. Some disinfectant entering the brush cover 184 through hole 579 may adhere to base 510 and surfaces 591A, 591B and 591C. Additionally, some of the disinfectant entering the brush cover 184 may be flung by the rotating brushes toward the surfaces within the brush cover 184. Thus, any adhering disinfectant may flow downward under gravity around the protruding recesses 588A, 588B, 588C and 588D.

Returning again to FIG. 5A, the first gear housing portion 213 has a generally quasi-triangular shape profile. The quasi-triangular shape profile may include a base end 560 and a truncated apex 563 wherein the base end 560 may include rounded corners 561 and 562. The base end 560 may be oriented at the top side TS. The side wall ledge segments 570 and 570' may be angled from the base end 560 to the truncated apex 563. The truncated apex 563 may be oriented at the underside US. The corners 567 and 568 of the apex 563 may be rounded.

The chamber 216 may comprise two symmetrical circular chamber areas CA and CA' which are side-by-side and create generally the rounded corners 561 and 562 of the base end 560. The two symmetrical circular areas CA and CA' may include recesses 588A and 588B, respectively, and that portion of base 510 which extends from the opening of recesses 588A and 588B to the flange 575 within the chamber 216. The curvature of the rounded corners 561 and 562 may include an arc segment of a circle. The two symmetrical circular areas CA and CA' may be slightly overlapping to form apex 565 wherein the circular curvature of the chamber areas discontinue at apex 565. Beginning from the side with chamber area CA with recess 588A, and moving across to chamber area CA', the circular curvature of chamber area CA discontinues as apex 565, travels the profile of apex 565 such that chamber area CA' begins at apex 565 and continues along a circular curvature until reaching an indention 576' where the flange 575 at the indentation 576' curves inward toward the chamber 216. Indentation 576' may include hole 578. Indentation 576' may serve as a transition of the arc segment to the generally linear slanted profile of ledge segment 570'. The ledge segment 570' having a widening area protruding into the chamber 216 to accommodate hole 578. The beginning of the arc segment of rounded corner 561 of chamber area CA may be adjacent and integral with indention 576 diametrically opposing indention 576. Likewise, the indentation 576 may serve as a transition of the arc segment to the generally linear slanted profile of ledge segment 570. The ledge segment 570 may have a widening area protruding into the chamber 216 to accommodate hole 578. Ledge segments 570 and 570' each may include a second indentation which may widen an area protruding into the chamber 216 to accommodate another hole 578. The flange 575 tracking the profile of the chamber 216 including any indentations so that the holes and fasteners may be outside of the chamber 216.

In an embodiment, the two symmetrical circular chamber areas CA and CA' are overlapping substantially at the point of the apex 565.

The apex 565 may be configured to extend in the chamber 216 in the direction toward the gears and thus rotating brushes. The apex 565 may provide hole 579 at a location which positions the disinfectant injection directly above the overlapping point of the counter rotating brushes 186A and 186B. The disinfectant 123*a* may have direct and center access to the teats as the teats are being directed from above the brushed 186A and 186B to between the brushes 186A and 186B. Thus, the amount of spent disinfectant 123*a* per teat may be minimized.

The hole 579 may be formed at a location which may be outside or adjacent the sealed gear chamber 216. Hence, any disinfectant leaking from a DD line failure or DD line leak may not seep into the internal sealed gear chamber 216. The sealed gear chamber 216 may be surrounded by an external side wall ledge (ledge segments 570, 570', 570", and 570''') to fasten together the first and second housing portions 213 and 215 at a location which may be outside or adjacent the chamber 216. Hence the fasteners and holes 578 may not provide access points for entry of debris and disinfectant into the chamber 216. Portions of the interior of the chamber 216 can be seen in FIG. 15.

The curvature of the rounded corner 568 may include an arc segment of a circle beginning from the indentation on ledge segment 570' to the indentation associated with truncated apex 563. The arc segment of the circle at corner 568 may track the curvature of recess 388C along the arc segment.

Figure 6A:
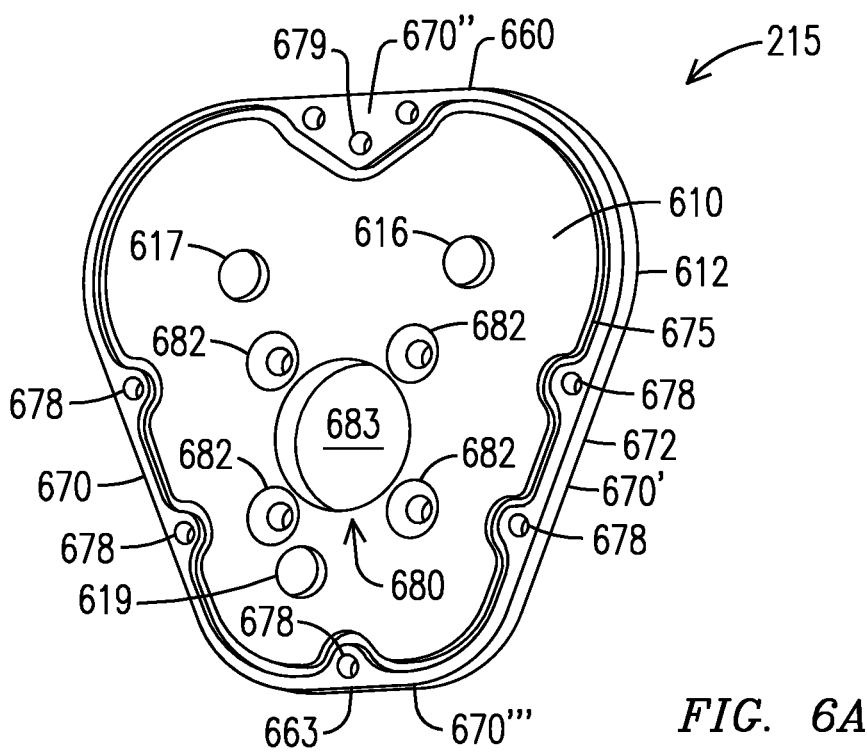
FIGS. 6A and 6B illustrate first and second side perspective views of the second gear housing portion.
Figure 6B:
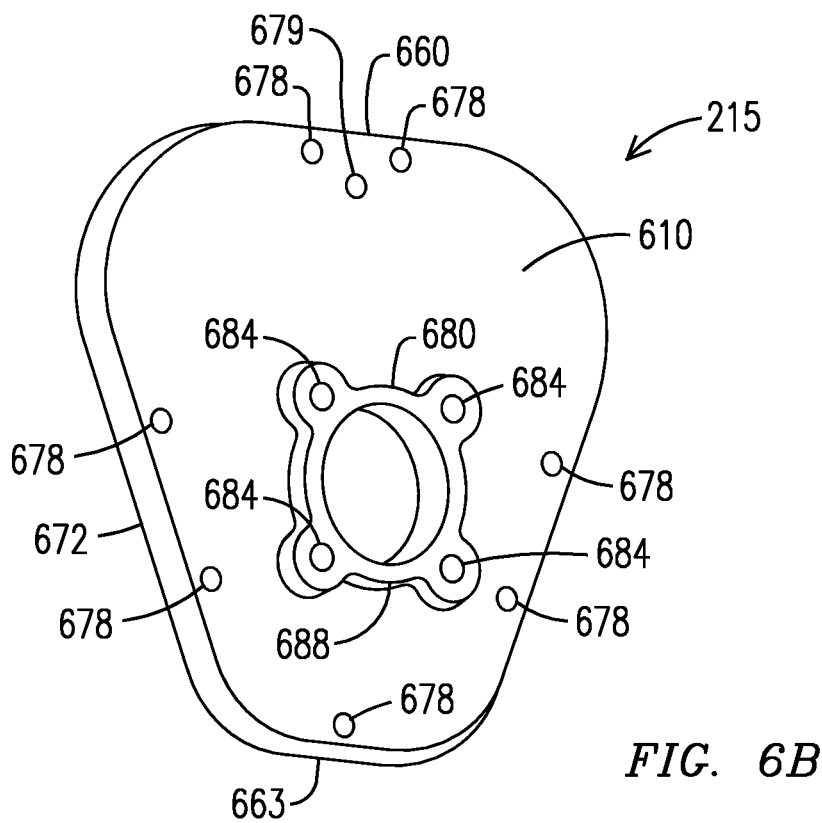

FIGS. 6A and 6B are first and second side views of the second gear housing portion 215. The second gear housing portion 215 includes a base 610. The perimeter profile of the second gear housing portion 215 tracks the perimeter profile of the first gear housing portion 213. The base 610 may include a side wall ledge 612 which may be continuous about the perimeter 672. The side wall ledge of the second gear housing portion 215 may include side wall ledge segments 670, 670', 670" and 670'''. The side wall ledge may include a perimeter groove 675 to mate with the flange 575 of the first gear housing portion 213 in an abutting mated arrangement. In an embodiment, the mated coupling of the first gear housing portion 213 to the second gear housing portion 215 is sealed. By way of non-limiting example, the mated coupling includes a sealing member or gasket 214 which may be recessed within the perimeter groove 675, as best seen in FIG. 15. The gasket 214 may be made of rubber, plastic or other material that may make the sealed gear housing leak-proof. The gasket having a profile that tracks the shape of the groove 675.

The side wall ledge segments 670, 670', 670" and 670''' may comprise holes 678 for the attachment of fasteners (not shown) to fasten the first and second gear housing portions 213 and 215 together. As can be appreciated, the holes 678 may be aligned with holes 578 of the first gear housing portion 213. The holes 678 may be on the exterior side of the sealed gear chamber 216. The area within the perimeter groove 675 when the first and second gear housing portions 213 and 215 are secured may serve to complete the area and volume of the sealed gear chamber 216. The side wall ledge segment 670" extends across the base end 660 and may include hole 679. Hole 679 may be configured to receive DD line 140. The hole 679 of second gear housing portion 215 may be aligned with the hole 579 of the first gear housing portion 213. The side wall ledge segment 670''' may extend across the truncated apex 663.

With specific reference to FIG. 6A, the interior side of the second gear housing portion 215 includes a motor mount hub 680 which may include a central aperture 683 surrounded by a plurality of recesses 682. The recesses 682 have a depth which extends past the plane of base 610, as will be described in more detail in FIG. 6B. The plurality of recesses 682 may be threaded. The term "central" in relation to the term "central aperture" does not represent a location that is at a center.

With specific reference to FIG. 6B, the motor mount hub 680 may include a ring 688 which projects past the plane of the base 610. The ring 688 may have an opening to create the central aperture 683. The distal end of each recess 682 has an aperture formed therein to create the plurality of holes 684. Each recess 682 may be created by a raised bodies starting from the base 610 and extending therefrom. Each recess 682 may include hole 684 therein. The recesses 682 may be, equally spaced around the central aperture 683. The motor mount hub 680 may allow for the mounting or attachment of the motor 238 to the sealed gear housing 205. The recesses 682 may be countersink holes so that heads of fasteners (not shown) may be recessed therein.

As seen in FIG. 15, a gap is created between the base 510 of the first gear housing portion 213 and the base 610 of the second gear portion 215. The gap is part of the internal sealed gear chamber 216. The gears 188A, 188B, 188C, and 188D may be housed in the gap between the base 510 of the first gear housing portion 213 and the base 610 of the second gear portion 215. The respective bearings 223, 225, and 227 are mounted to the gears 188A, 188B, and 188C around a gear collar 1275 such that the bearings 223, 225 and 227 are recessed or seated in recesses 588A, 588B and 588C, respectively. The second gear housing portion 215 may include recesses 616, 617, and 619. In an embodiment, bore holes 1252 (FIG. 14) of each gear may be open at each end. In the event, the ends of brushes 186A, 186B and 186C, respectively, pass through the open end of the bore hole 1252 (FIG. 14), the recesses 616, 617 and 619 would receive and support the brush ends when the first and second gear housing portions 213 and 215 are brought together in abutting engagement. The recesses 616, 617 and 619 are closed to seal the gear housing 205 from debris and other material during the cleaning of the teats. In an embodiment, the second gear housing portion 215 may be sealed from the cavity within the second housing portion 209.

Figure 9:
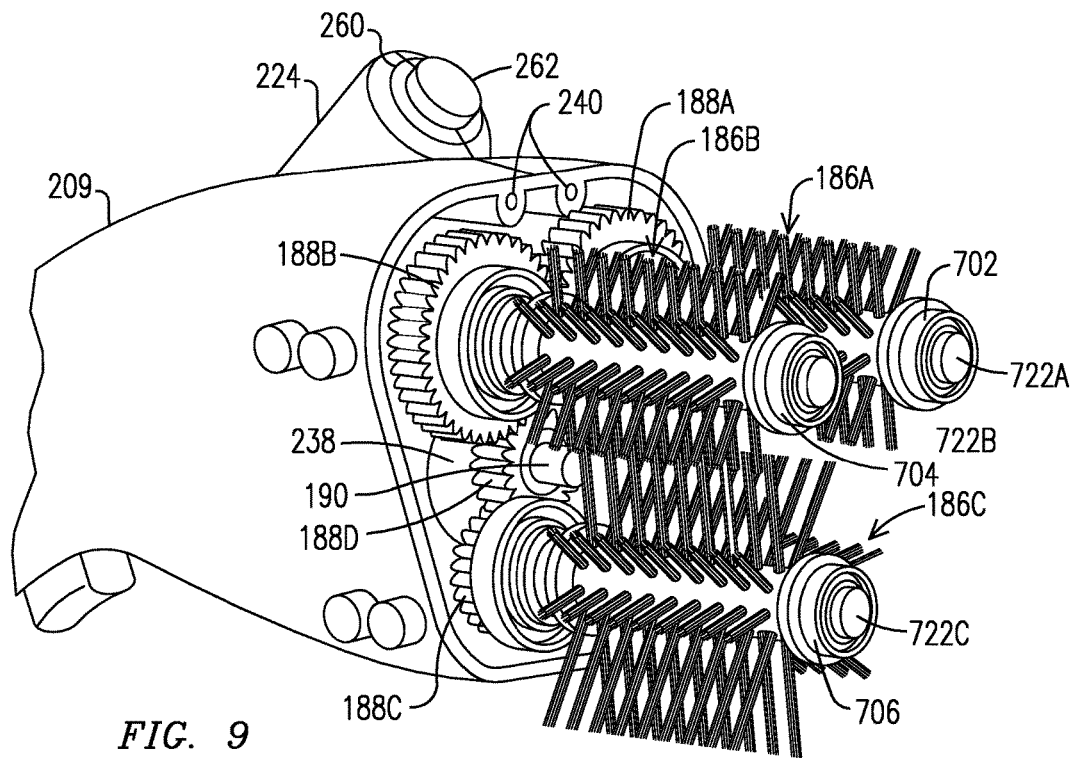
FIG. 9 illustrates a perspective end view of the brushes and gears with the sealed gear housing removed.

Referring now to FIGS. 3A and 9, the forward section 221 includes a plurality of fastening members 240 configured to align with the plurality of holes 578 and 678 of the sealed gear housing 205 so that the housing 205 may be firmly secured within the interior cavity of the forward section 221 of the housing section 209.

Figure 7:
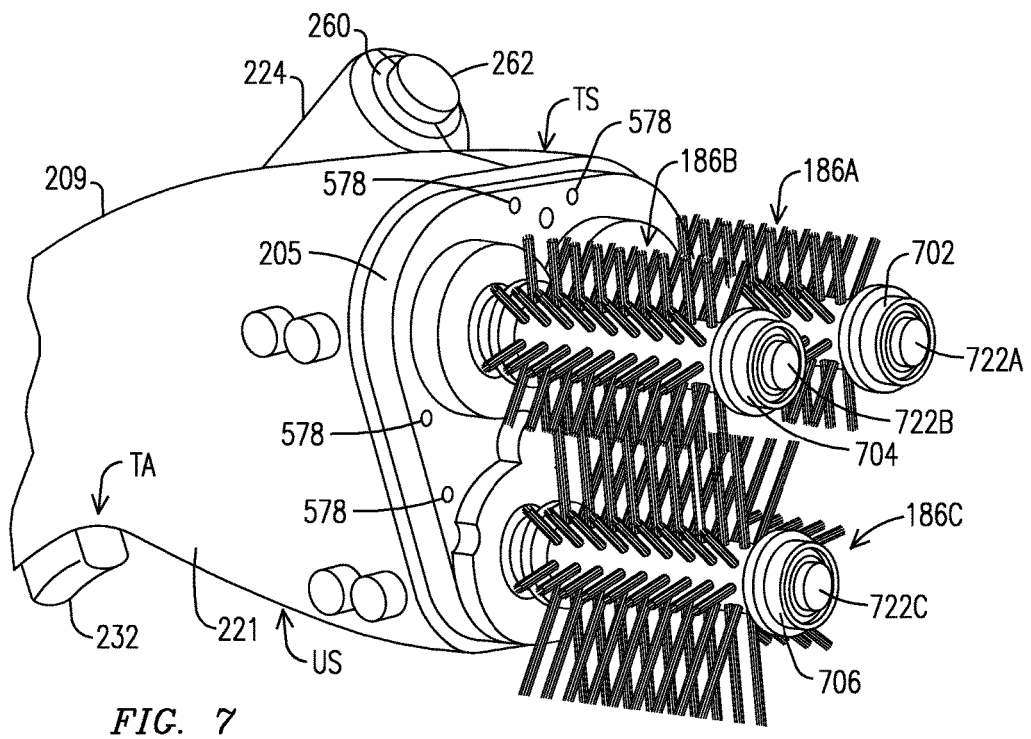
FIG. 7 illustrates a perspective end view of the sealed gear housing inserted in the housing section of the hand-held applicator.
Figure 8:
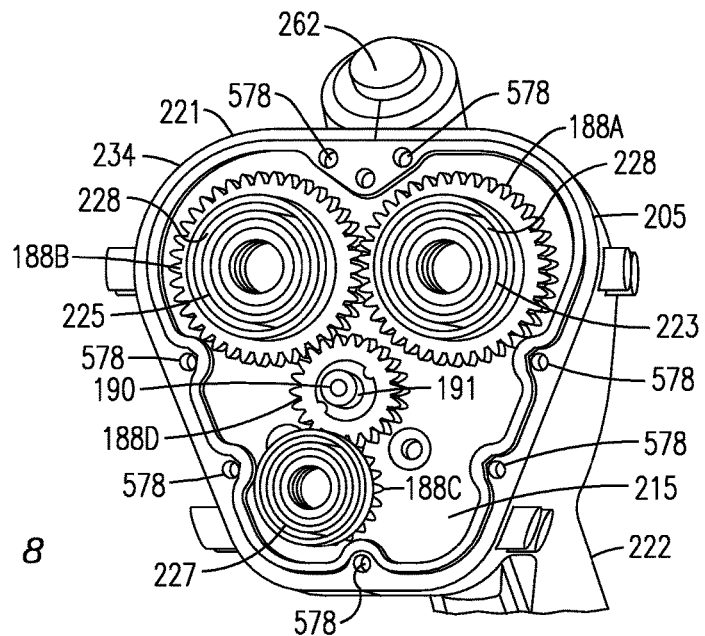
FIG. 8 illustrates a perspective end view of the sealed gear housing inserted in the housing section of the hand-held applicator with the first gear housing portion removed.

Referring also to FIG. 7, a perspective end view of the sealed gear housing 205 inserted in the housing section 209 of the hand-held applicator 126 is illustrated. The top side TS approximate the first distal end of the forward section 221 may comprise a light holder 224 for installation of the light source 160.

The light source 160 may comprise a light socket 260 and a lighting element 262 coupled to the light socket 260. The lighting element 262 may be a light emitting diode (LED), light bulb or other illuminator. In the illustration, the lighting socket 260 is held in the holder at an angle with respect to the top side TS. The light source 160 may be configured to illuminate the area over teat access port 1030 (FIG. 10B) into the brush cover 184.

The light source 160 may be feed electrical power from the electrical lines 196 within the integrated cable 198.

Hence, the light source 160 may be turned ON or OFF based on the activation (depression) of switch 232.

In the illustration of FIG. 7, the sealed gear housing 205 when installed may protruded from (or out of) the forward section 221. The sealed gear housing 205 has a diameter or perimeter profile which is less than the housing section 209 and which is less than the brush cover 184. More specifically, when the sealed gear housing 205 is installed, the first gear housing portion 213 may extend out of forward section 221. The side wall ledge segments 670, 670', 670" and 670''' of the second gear housing portion 215 may be essentially flush with the forward distal end/edge 234 (FIG. 8) of the forward section 221.

The brushes 186A, 186B and 186C may include distal ends 722A, 722B and 722C opposite proximal distal ends coupled to gears 188A, 188B, and 188C. The distal ends 722A, 722B and 722C may have coupled thereto corresponding bearings 702, 704 and 706, as best seen in FIGS. 7 and 9. Further details of the brushes 186A, 186B and 186C will be described herein with respect to FIGS. 13A-13B and 14. As can be appreciated, FIG. 9 illustrates a perspective end view of the brushes and gears with the sealed gear housing removed. The gears and bearings within the sealed chamber 216 can be viewed since the sealed gear housing is removed from illustration in FIG. 9.

The brush cover 184 when installed slides or slips over the first gear housing portion 213 so that the first gear housing portion 213 may extend into the cavity of the brush cover 184. In an embodiment, that portion of the brush cover 184 is juxtaposed the perimeter of the first gear housing portion 213 which may provide support to the brush cover 184.

Referring also to FIG. 8, a perspective end view is illustrated of the sealed gear housing 205 inserted in the housing section 209 with the first gear housing portion removed. The motor 238 (FIGS. 3A, 3B and 4) may be positioned within the housing section 209 of the applicator 126 behind or rearward of the second gear housing portion 215. The motor 238 may be operatively connected to the gears 188A, 188B, 188C, and 188D to rotate the brushes 186A, 186B, and 186C. The motor 238 may include a drive shaft 190 that may be inserted through an opening 191 in the gear 188D, such that the motor 238 and the drive shaft 190 are in direct drive connection with the gears 188A, 188B, 188C, and 188D. The gear 188D may be a central gear of the plurality of gears 188A, 188B, 188C and 188D. The gears 188A and 188B are counter rotating gears. Gear 188C is a lower gear. The central gear (i.e., gear 188D) is coupled below the pair of counter rotating gears (i.e., gears 188A and 188B) to directly provide a torque to one of the counter rotating gears by the drive shaft 190. The lower gear (i.e., gear 188C) is coupled below the central gear and being directly coupled to the central gear such that the central gear directly provides torque to the lower gear by the drive shaft 190.

The term "central" in relation to the gear does not represent a location that is at a center. Instead, "central" indicates that the gear 188D originates the torque by being directly coupled to the drive shaft 190 of the motor 238.

In an embodiment, the motor 238 may be a 24V DC motor. However, the motor 238 is not limited to any specific motor, provided that the motor is capable of being housed within the applicator housing 127 and can be operatively connected to the gears to drive the brushes.

In an embodiment, the size and weight of the motor 238 may be chosen, for ergonomic considerations. By way of non-limiting example, the motor may be lightweight so that the applicator 126 can be lifted by an operator and moved within a milking parlor so as to clean teats.

In an embodiment, the sealed gear housing 205 may be sealed and made from a lightweight material such as plastic. Additionally, the sealed gear housing 205 may be configured to house one or more gears also made of light weight material. The sealed gear housing 205 may be configured to prevent debris from entering the housing during the cleaning of the teats, and to contain lubricant for the gears. In another embodiment, the gears 188A, 188B, 188C, 188D may be made of a self-lubricating plastic or polymer material, for example.

In the event of a malfunction to a component of the hand-held applicator 126, such as a malfunction of the motor 238, a malfunction of one or more of the gears 188, a malfunction of one or more of the brushes 186, a malfunction of the switch 232 and/or breaking of one or more portions of the applicator housing 127, the hand-held applicator housing 127 can be detached from the flexible cable 198. Thereafter, the detached hand-held applicator 126 may be transported to a remote site, for repair to the one or more components of the applicator 126, or parts may be recycled for example.

In an embodiment, the disinfectant and electrical signals may be delivered through a fixed cable having strain relief, thus eliminating the connector at the base of the applicator. In such an embodiment, a connector would be positioned at a distance from the applicator, to keep the connector away from water spray and accidental disconnection and abuse.

Figure 10A:
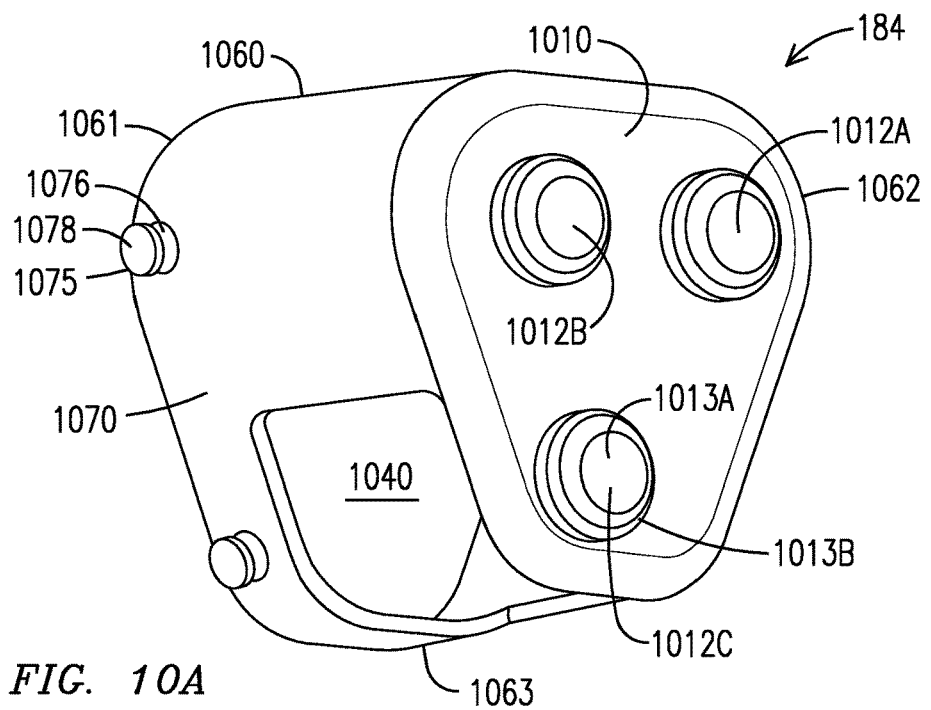
FIGS. 10A and 10B illustrate front end and rear end perspective views of the brush cover of the hand-held applicator.
Figure 10B:
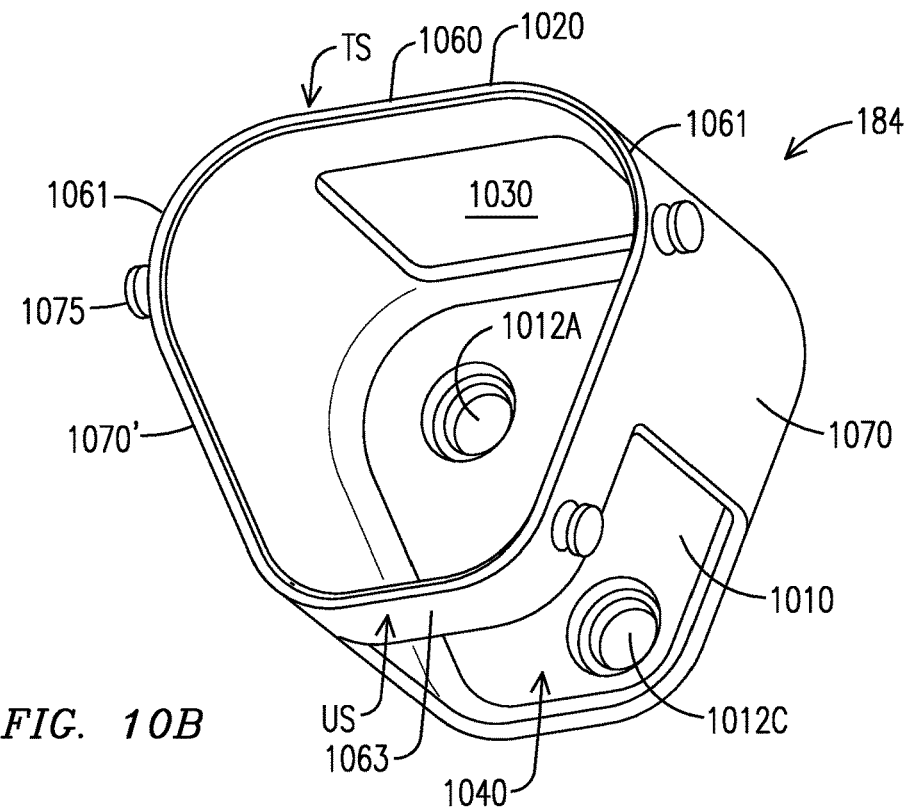

FIGS. 10A and 10B are front end and rear end perspective views of the brush cover 184 of the hand-held applicator 126. The brush cover 184 has an end wall 1010 having a plurality of recesses 1012A, 1012B and 1012C formed therein. The end wall 1010 may correspond to a first distal end of the brush cover 184. The plurality of recesses 1012A, 1012B and 1012C may extend and protrude through the plane of the end wall 1010. The plurality of recesses 1012A, 1012B and 1012C may be closed to the exterior side of the end wall 1010.

The plurality of recesses 1012A, 1012B and 1012C may be configured to cradle therein distal ends 722A, 722B and 722C of brushes 188A, 188B and 188C, respectively, and corresponding bearings 702, 704 and 706, as best seen in FIGS. 7 and 9. In an embodiment, the plurality of recesses 1012A, 1012B and 1012C may comprise a stepped recess cavity comprising a first recess cavity portion 1013A and a second recess cavity portion 1013B. The circumference of the first recess cavity portion 1013A may be smaller than the circumference of the second recess cavity portion 1013B. The first recess cavity portion 1013A may be dimensioned to receive the distal end 722A, 722B or 722C of one of the brushes 188A, 188B or 188C. The second recess cavity portion may be dimensioned to receive a bearing 702, 704 or 706.

The brush cover 184 may have a quasi-triangular shaped profile which may track the quasi-triangular shape profile of the sealed gear housing 205 and the housing section 209. The quasi-triangular shape profiled of the brush cover 184 may include a base end 1060 and a truncated apex 1063 wherein the base end 1060 may include rounded corners 1061 and 1062. The quasi-triangular shape profiled of the brush cover 184 may include side walls 1070 and 1070' angled from the base end 1060 to the truncated apex 1063. The base end 1060 is configured to be top side TS and the truncated apex 1063 may be configured to be oriented at the underside US of the applicator housing 126.

The brush cover 184 may include a second distal end 1020 which may be open and dimensioned to abut the forward distal end of the housing section 209. The top side TS of the brush cover 184 includes a teat access port 1030, as best seen in FIG. 10B. Additionally, the underside of the brush cover 184 may include an outlet port 1040. The outlet port 1040 may extend from the underside US of the brush cover 184 to sidewall 1070. A portion of the brush 186C may extend through the outlet port 1040. The outlet port 1040 may allow debris and disinfectant to exit the applicator 126 under the force of gravity.

In proximity to the second distal end 1020, the brush cover 184 may include at least one pillar 1075. In an embodiment, there are a plurality of pillars 1075. By way of non-limiting example, sidewall 1070 may include at least one pillar 1075 and sidewall 1070' may include at least one pillar 1075. The at least one pillar 1075 may have a length that allows a strap, tie or tethering member 128 to fasten the pillar of the brush cover 184 to a pillar of the housing section 209. In an alternate embodiment, the other means of strapping the brush cover 184 to the housing section 209 may be used.

In an embodiment, the brush cover 184 and the housing section 209 may be hingedly coupled at one location via a hinge (not shown) and fastened at a separate location.

The pillar 1075 may comprises a shaft member 1076 and a head member 1078. The shaft or post member 1076 may have one distal end coupled to or integrated with the sidewall 1070. The shaft or post member 1076 having the other distal end coupled or integrated with the head member 1078. The circumference of the shaft or post member 1076 may be smaller than the circumference of the head member 1078. In an embodiment, the strap, tie or tethering member 128 may be secured on the shaft or post member 1076 under the head member 1078 wherein the head member 1078 prevents the strap, tie or tethering member 128 from slipping off of the shaft or post member 1076.

In addition, if any components of the hand-held applicator 126 fail or require repair, the hand-held applicator 126 may be separated from the cable 198, and assuming there is an available inventory, the applicator 126 may be replaced. The removed applicator may be repaired onsite or returned to the supplier for refurbishment.

Figure 12:
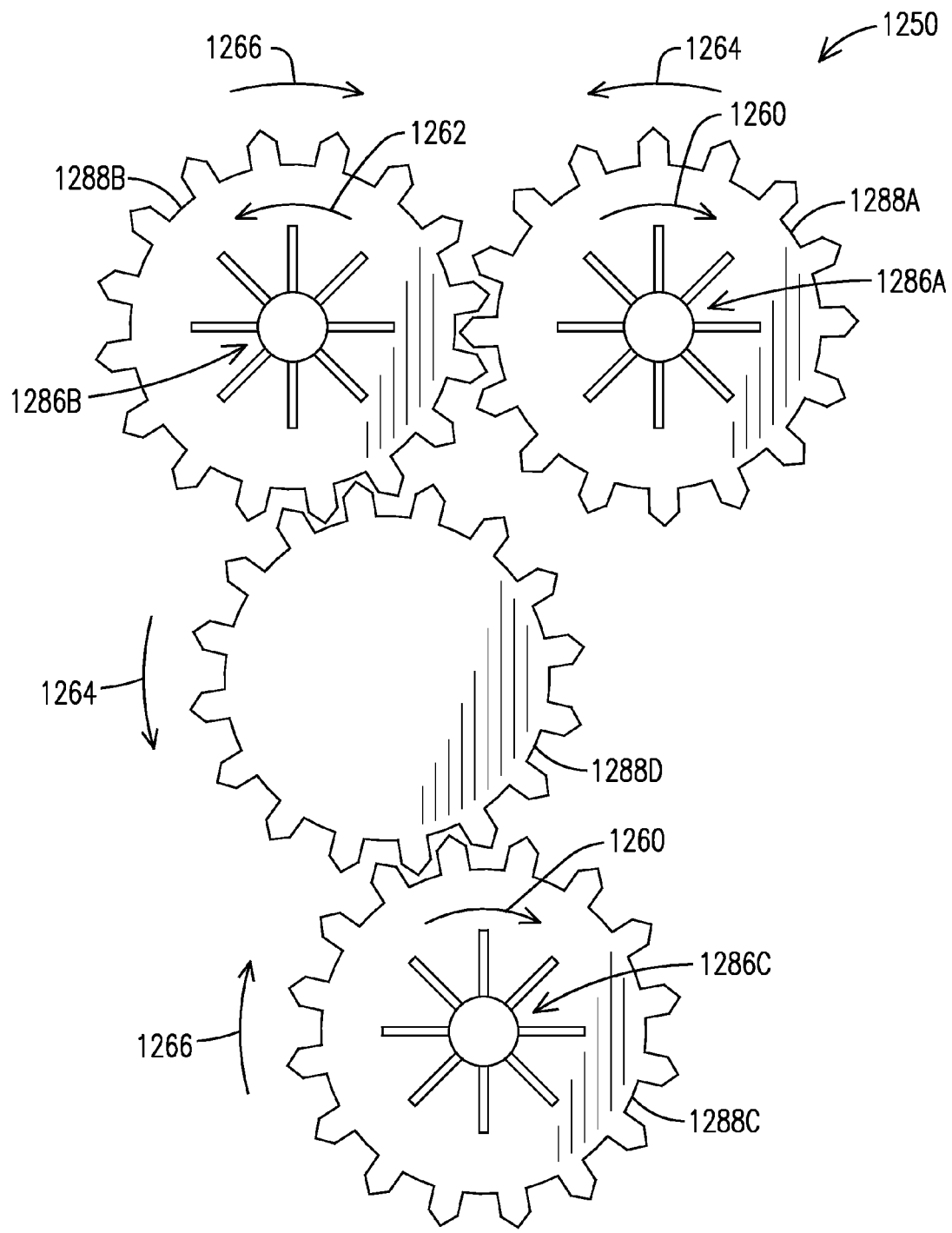
FIG. 12 illustrates a schematic of a plurality of gears and brushes.
Figure 13A:
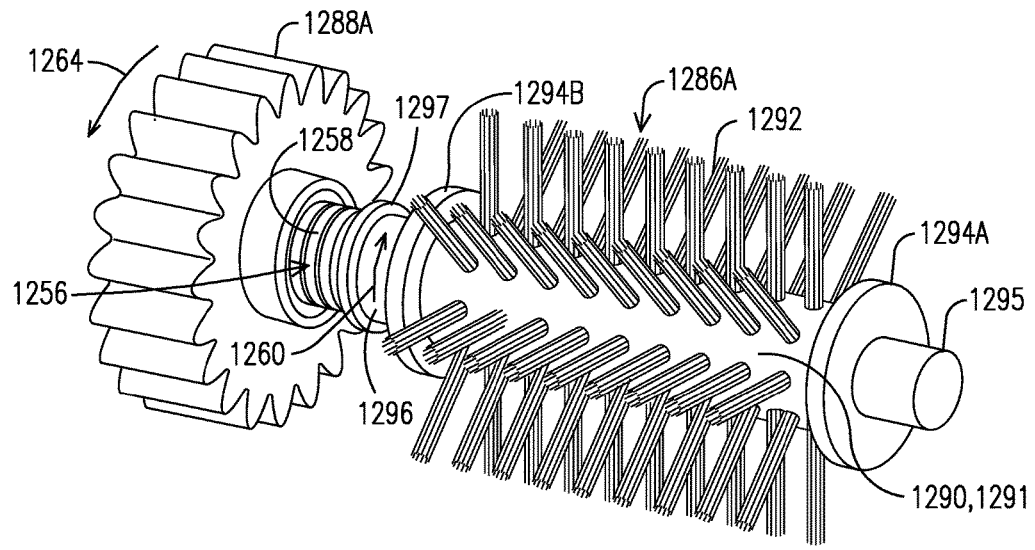
FIGS. 13A and 13B illustrate side perspective views of a gear threaded out from and onto a brush shank.
Figure 13B:
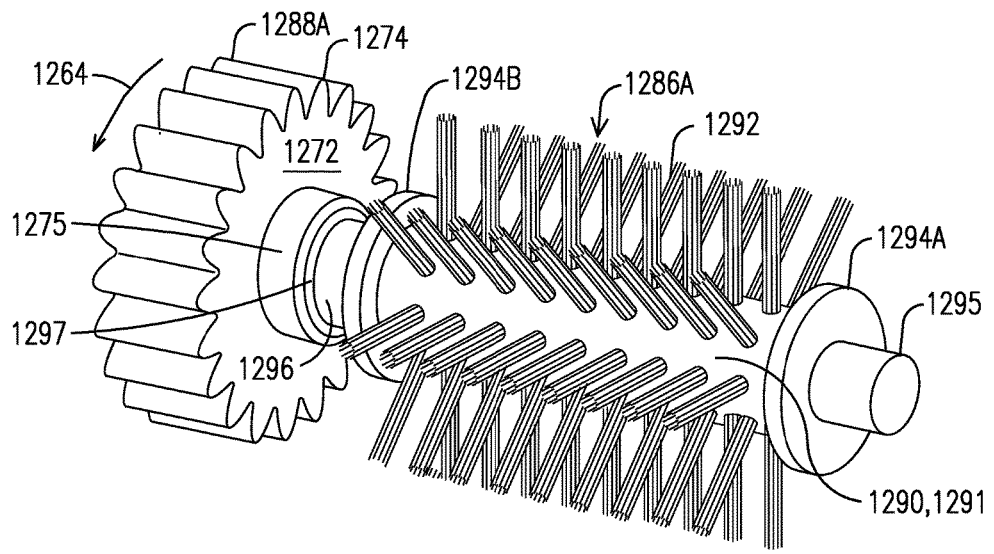
Figure 14:
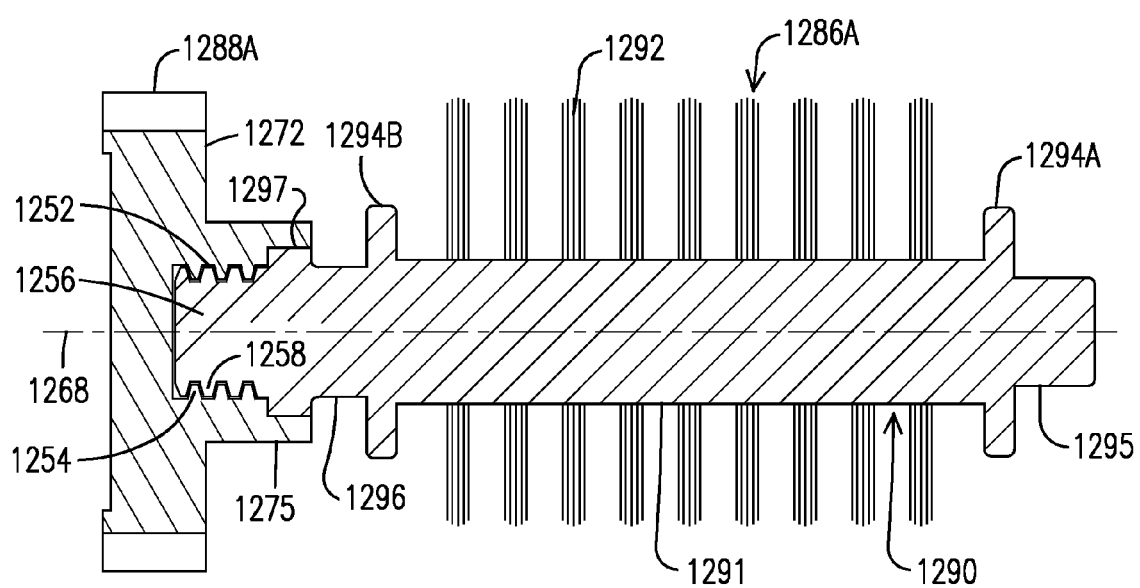
FIG. 14 illustrates a sectional view of the gear assembly of FIG. 13B with the brush rotatably mounted to the gear.

FIG. 12 illustrates a schematic of the threaded gear assembly 1250. FIGS. 13A-13B, and 14 illustrate a brush and threaded gear of the assembly in which one or more gears may include a central boring that may be internally threaded for receiving a part that has external threading to couple the part and gear together. During one or more of the cycles (washing or drying), the gear may rotate in the same direction of rotation the gear may be rotated to fix the gear onto the part (brush) or the opposite direction in which part (brush) may be rotated in order to fix the part to the gear. In this manner, as the gear rotates during operation, it rotates in a direction that may continuously tighten, at least to a point, the parts together.

The prior art coupling of the parts including matching geometric shapes of the gear boring and part shaft; however, over time the interface at these locations between the gear and part begins to wear. This wear may be due in part to debris including sand, dirt, soil etc. eventually accessing this area, and/or the points of contact at the interface. As the interface wears down the part (namely a brush) axis of rotation may no longer be aligned with that of the gear and the part begins to wobble and eventually not functional. The below described threaded engagement between a gear and rotating part minimized wear at the interface of the gear and part (brush) as the gear rotates in a direction that tightens the gear and part (brush) to gear; and, the interface between the gear and part (brush) minimizes the intrusion of debris.

While the above-described threaded gear assembly may be used with or in various types of parts, components and machines, it is described herein, by way of example, in reference to a hand-held applicator 126 (FIG. 1) of a system for cleaning teats of milk-producing animals. With reference to FIG. 12, the gear assembly 1250 of the hand-held applicator may include gears 1288A, 1288B, 1288C, and 1288D that may be positioned within the applicator housing and, specifically, the sealed gear housing. Each gear 1288A, 1288B, and 1288C may include a threaded centered boring 1252 (FIG. 14) to rotatably mount the brushes 1286A, 1286B, and 1286C of the applicator thereto. The brushes 1286A, 1286B, and 1286C are not drawn to scale, and indeed are shown with smaller diameter for purposes of better illustrations directions of rotations. The gear 1288D may be rotatably coupled to the motor 238 (FIG. 1), which rotates the gear 1288D in a first direction 1264. As further illustrated in FIG. 12, the gear 1288D may be in drive communication with the other gears 1288A, 1288B, and 1288C, and thus the gears 1288B and 1288C rotate in a respective first direction 1266 that is opposite to the first direction 1264 of the gear 1288D.

As further illustrated in FIG. 12, the outer perimeter teeth 1274 (FIGS. 13A and 13B) of the gear 1288A meshes with the outer perimeter teeth 1274 of the gear 1288B and thus the gear 1288B rotates in a first direction 1266 that is opposite to the first direction 1264 of the gear 1288A. The outer perimeter teeth 1274 of gear 1288C meshes with the outer perimeter teeth 1274 of the gear 1288D. Thus, during rotation of gear 1288D, the gear 1288D may impart a torque on gear 1288B. The gear 1288B may impart a torque on gear 1288A by the interlinking of the teeth. The outer perimeter teeth 1274 of the gear 1288C may be meshed with the outer perimeter teeth 1274 of gear 1288D. Hence, as gear 1288D is rotated, simultaneously, both gears 1288B and 1288C may have a torque imparted thereto.

During an operation of the gear assembly 1250, the gears 1288B and 1288C may rotate in their respective first directions 1266, and may be in mechanical drive communication with the brushes 1286B and 1286C, respectively, to impart a torque onto the brushes 1286B and 1286C to rotate in that same first direction 1266. Additionally, during the operation of the gear assembly 1250, the gear 1288A rotates in its respective first direction 1264, and may be in mechanical drive communication with the brush 1286A, to impart a torque onto the brush 1286A to rotate in the respective first direction 1264.

As will be explained in more detail below, the arrows 1260 and 1262 represent respective directions the brushes 1286A, 1286B and 1286C may be rotated to fix a gear and corresponding brush to one another. As shown, the gears 1288A, 1288B and 1288C rotate during operation in a direction that is opposite to the direction the brushes 1286A, 1286B and 1286C, respectively, and may be rotated to couple the two parts together. That is, the gears 1288A, 1288B and 1288C, during operation, may rotate in a direction that tightens each respective gear and brush together.

FIGS. 13A and 13B illustrate side perspective views of a gear threaded out from and onto a brush shank. FIG. 14 illustrates a sectional view of the gear assembly of FIG. 13B with the brush rotatably mounted to the gear. Since the brushes 1286A and 1286B and gears 1288A and 1288B may be essentially identical, only one such brush 1286A and gear 1288A will be described in detail with any differences noted.

The brush 1286C is also similar to brushes 1286A and 1286B. However, the gear 1288C may be generally similar to gears 1288A and 1288B except for size.

The brush 1286A may comprise brush shaft 1290. The brush shaft 1290 may include a central shaft member 1291 having a plurality of brush bristles 1292 radiating therefrom. The central shaft member 1291 may have first and second distal ends terminating at flanges 1294A and 1294B, respectively. The brush shaft 1290 may further comprises a first shaft end 1295 projecting from flange 1294A. In one embodiment, the shaft end 1295 may have a smaller circumference then the circumference of the central shaft member 1290. The brush shaft 1290 may further comprises a second shaft end 1296 projecting from flange 1294B. The shaft 1290 may comprise first shaft end 1295, flange 1294A, central shaft member 1290, flange 1294B, second shaft end 1296 and end brush flange 1297. End brush flange 1297 being located at the other distal end of the second shaft end 1296 opposite that of the flange 1294B.

The brush 1286A may include a shaft portion 1256 with external threading 1258. The shaft portion 1256 may be adjacent to and extending past end brush flange 1297. In FIG. 13A, a portion of shaft portion 1256 is shown where the shaft portion 1256 is only partially threaded in the gear 1288A. In FIG. 13B, the shaft portion 1256 is not readily seen since the shaft portion 1256 is threaded within the gear 1288A. In an embodiment, the shaft portion 1256 may be threaded into gear 1288A. For example, the end brush flange 1297 may have a diameter that fits within the gear collar 1275 such that the top edge of the gear collar 1275 and a top surface of the end brush flange 1297 are flush, as best seen in FIG. 14. Hence, the end brush flange 1297 may be recessed within the gear collar 1275. Alternately, the end brush flange 1297 may have a diameter that allows the underside of the end brush flange 1297 to be stopped by the top edge of the gear collar 1275.

The gear 1288A may comprise a disk-shaped member 1272 having a perimeter with a plurality of radiating teeth 1274 circumferentially arranged and integrated with the perimeter of the disk-shaped member 1272. The teeth 1274 of the gears may be spaced apart so that the teeth of linked gears can mesh or be interleaved. The center of the disk-shaped member 1272 has the bore hole 1252 with a hole circumference and a gear collar 1275. The gear collar 1275 has an inner circumference which surrounds the hole circumference at the open (first) end of the bore hole 1252. The other (second) end of the bore hole 1252 may be closed from ambient conditions. The internal circumferential surface of the gear collar 1275 may be threaded. The bore hole 1252 may be closed to seal the interface between the gear and the brush.

The side of the disk-shaped member 1272 opposite the side with the gear collar 1275 may be recessed. For example, an area of the disk-shaped member 1272 which does not include the teeth 1274 may be recessed.

The end brush flange 1297 may assist in sealing the bore hole 1252 when the end brush flange 1297 is in surface-to-surface contact with a top end of the gear collar 1275. Nonetheless, the seating of the end brush flange 1297 may close the bore hole 1252 from ambient conditions.

As illustrated in FIG. 14, gear 1288A may comprise a centered bore hole 1252. The centered bore hole 1252 may include internal threading 1254 along a length of an internal surface of the bore hole 1252 that correspond to the external threading 1258 along the shaft portion 1256 of the brush 1286A. In an embodiment, the centered bore hole 1252 includes at least a portion of the depth of the disk-shaped member 1272 and gear collar 1275. The internal threading 1254 and external threading 1258 may have a cross-sectional trapezoidal shape. The use of the term "external threading" is defined as threads formed on and around an external or exterior surface. The use of the term "internal threading" is defined as threads on an internal or interior surface. The term "internally threaded" is defined as an internal surface having threads formed thereon.

In an embodiment, the internal threading of the gear 1288A may only be on the length of the gear collar 1275. The internal threading of the gear 1288A may be only along the length of the bore hole 1252 or both the length of the gear collar 1275 and the bore hole 1252.

As illustrated in FIG. 14, in order to rotatably mount the brush 1286A within the bore hole 1252 of the gear 1288A, the shaft portion 1256 may be aligned with the bore hole 1252 and the brush 1286A may be subsequently rotated in a direction 1260 that may be opposite to the respective direction 1264 of rotation of the gear 1288A, until shaft portion 1256 may be seated in the bore hole 1252. The bore hole 1252 shown in FIG. 14 includes a bottom so that the second end is a closed end; however, the bore hole 1252 may extend the entire depth or thickness of the gear 1288A. Alternatively or simultaneously, the gear 1288B may be rotated in the respective direction 1266 (FIG. 12) of rotation while brush 1286B may be subsequently rotated in the direction 1262 (FIG. 12) of rotation to fix the gear 1288B and brush 1286B together.

The threaded engagement between the gear 1288A and the brush 1286A in the gear assembly 1250 may be configured to prevent wear and minimize vibration between the gear 1288A and the brush 1286A and thus maintain an alignment between a rotational axis 1268 of the gear 1288A and a central longitudinal axis (or a rotational axis) of the brush 1286A during an operation of the gear assembly 1250. Additionally, the rotation of the gear 1288A in the respective first direction 1264 may be configured to maintain the threaded engagement between the external threading 1258 and the internal threading 1254, during the operation of the gear assembly 1250. As further illustrated in FIG. 14, the external threading 1258 and the internal threading 1254 have a depth that may be sufficient to minimize wear between the gear 1288A and the brush 1286A and maintain the alignment between the rotational axis of the gear 1288A and the central longitudinal axis of the brush 1286A.

In an embodiment, the gears 1288A, 1288B, and 1288C and at least the shaft portion of the brushes 1286A, 1286B, and 1286C may be made from a self-lubricating plastic material. In the event that the brush 1286A, 1286B, and 1286C need to be replaced, the brush 1286A, 1286B, and 1286C may be simply unscrewed from the gear 1288A, 1288B, and 1288C and replaced with a new brush. In an embodiment, the gears 1288A, 1288B, 1288C and 1288D may be made of an acetal resin or other self-lubricating plastic. An acetal resin is manufactured by Dupont® and sold under the brand name DELRIM®. Additionally, other components such as, without limitation, the bearings may be made of a self-lubricating plastic material.

FIG. 15 illustrates a partial view of the hand-held applicator with portions of the brush cover 184, housing section 209 and sealed gear housing 205 cut away. FIG. 15 incorporates the sectional view of the gear assembly of FIG. 14 with the brush 1286A rotatably mounted to the gear 1288A or 188A. Hence, no further discussion about the brush 1286A will be described. In FIG. 15, the view of the sealed gear housing 205 with the abutting contact is illustrated wherein the perimeter groove 675 is shown mated with the flange 575 and with the gears within the gap between a first gear housing portion 213 and a second gear housing portion 215.

The plurality of recesses 1012A is shown cradling therein first shaft end 1295 of brush 1286A, and corresponding bearings 702. The flange 1294A may be located within the volume of space of brush cover 184. In other words, the flange 1294A may be located outside of the recess 1012A. In an embodiment, the flange 1294 may have a circumference which is larger than the opening into recess 1012A.

As previously described in relation to FIG. 14, the end brush flange 1297 may have a diameter that fits within the gear collar 1275 such that the top edge of the gear collar 1275 and a top surface of the end brush flange 1297 are flush. Furthermore, the end brush flange 1297 and the top of the gear collar 1275 may be flush with the exterior surface of the recess 588A. The exterior surface is the exterior surface within the brush cover 184.

While certain embodiments have been shown and described herein, such embodiments are provided by way of example only. Numerous variations, changes and substitutions will occur to those of skill in the art without departing from the scope of the embodiments herein. Accordingly, it is intended that the embodiments are limited only by the spirit and scope of the appended claims.

What is claimed is:

1. A hand-held applicator for cleaning a teat of a milk-producing animal, the hand-held applicator comprising:
    a first housing having a first end through which at least one disinfectant delivery line extends and at least one electrical line extends, a second end distal to the first end, a top side and an underside;
    a second housing having an internal sealed gear chamber, the second housing removably coupled to the second end of the first housing and in which the internal sealed gear chamber being configured to support therein a plurality of gears;
    wherein the second housing comprises:
        a first portion having a plurality of gear holes and a peripherally extending flange surrounding the gear holes, and
        a second portion having a motor mount and having a peripherally extending groove in which the flange of the first portion fits, the first and second portions each having at least one delivery port configured to be coupled to the at least one disinfectant delivery line;
    wherein the first housing comprises:
        a forward section dimensioned to receive therein a portion of the second housing, and
        a handle section juxtaposed to the forward section and tapering rearward from the forward section in a downward direction such that an angle is formed along a transition from the forward section to the handle section at the underside;
    a switch positioned at or in proximity to the transition from the forward section to the handle section; and
    a motor coupled to the motor mount, the motor residing within the forward section and configured to be in direct drive communication with the plurality of gears.

2. The hand-held applicator of claim 1, wherein the at least one delivery port includes a first delivery port on the second portion and a second delivery port on the first portion and the first and second delivery ports are located above and centered between a pair of side-by-side gears of the plurality of gears.

3. The hand-held applicator of claim 2 further comprising a light source on the first housing in proximity toward the second end of the housing section, the light source being disposed at an angle relative to an outside surface of the first housing to direct light toward the teats of an animal during a cleaning operation, the light source being aligned with the external delivery port.

4. The hand-held applicator of claim 1 further comprising:
    a plurality of scrubbing elements, and each scrubbing element is operatively connected to a respective gear through a respective gear hole in the first portion; and
    a brush cover being configured to surround the scrubbing elements, and the brush cover including an opening through which the teat is inserted for cleaning.

5. The hand-held applicator of claim 4 wherein the second housing has an outside diameter that is less than an inside diameter of the second end of the first housing, and is less than an inside diameter of the brush cover, and at least a portion of the second housing is disposed within the brush cover.

6. The hand-held applicator of the claim 1 wherein the second housing supports a plurality of bearings and the first portion of the second housing includes:
    a plurality of recesses, wherein each recess has a gear hole;
    an inside surface having the plurality of recesses;
    an outside surface, the outside surface faces the plurality of scrubbing elements; and
    each bearing is configured to be seated in a respective recess, and each recess is associated with one of the gear holes.

7. The hand-held applicator of claim 1 wherein:
    the motor comprises a drive shaft; and
    the motor mount comprising:
        a central aperture with a raised ring elevated past a base of the second portion, the ring elevated on an external side of the second portion;
        a plurality of countersink recesses surrounding the central aperture formed on an internal side of the second portion, the plurality of countersink recesses are elevated past the base of the external side; and
        the central aperture being configured to receive therethrough the drive shaft for engagement with a central gear of the plurality of gears for applying a torque directly to two gears of the other gears of the plurality of gears.

8. The hand-held applicator of claim 1, further comprising a gasket disposed in the groove of the second portion.

9. A hand-held applicator for cleaning a teat of a milk-producing animal accessing the hand-held applicator through a top side, the hand-held applicator comprising;
    a first housing having a first end through which at least one disinfectant delivery line extends and at least one electrical line extends, a second end distal to the first end, a top side and an underside wherein the top side of the first housing corresponds to the top side of the hand-held applicator;
    a removable second housing having an internal sealed gear chamber, a motor mount and a delivery port configured to be coupled to the at least one disinfectant delivery line, the second housing removably coupled to the second end of the housing section and in which the internal sealed gear chamber being configured to support therein a plurality of gears and bearings with the delivery port, being in proximity to a top side of the second housing, wherein the top side of the second housing corresponds to the top side of the hand-held applicator;

wherein the first housing comprises:
    a forward section dimensioned to receive therein a portion of the second housing, the forward section gradually narrowing rearwardly; and
    a handle section juxtaposed to the forward section and tapering rearward from the forward section in a downward direction such that an angle is formed along a transition from the forward section to the handle section at the underside;

wherein the second housing includes a first portion in abutting contact with a second portion and the abutting contact surrounds the plurality of gears;

a switch positioned at or in proximity to the transition from the forward section to the handle section; and a motor coupled to the motor mount, the motor residing within the forward section and configured to be in direct drive communication with the plurality of gears.

10. The hand-held applicator of claim 9, further comprising:
    a plurality of scrubbing elements and a plurality of gear holes in the first portion, and each scrubbing element is operatively connected to a respective gear through a respective gear hole in the first portion; and
    a brush cover being detachably secured to the second end of the housing section; the brush cover being configured to surround the scrubbing elements; and the brush cover including having a top side with an opening through which the teat is inserted for cleaning.

11. The hand-held applicator of claim 9, wherein the delivery port includes a first port on the second portion and a second port on the first portion and the first and second ports are aligned with each other and are located above and centered between a pair of side-by-side gears of the plurality of gears.

12. The hand-held applicator of claim 11 wherein:
the motor comprises a drive shaft; and
the motor mount comprising:
    a central aperture with a raised ring elevated past a base of the second portion, the ring elevated on an external side of the second portion;
    a plurality of countersink recesses surrounding the central aperture formed on an internal side of the second portion, the plurality of countersink recesses are elevated past the base of the external side; and
the central aperture being configured to receive therethrough the drive shaft for engagement with a central gear of the plurality of gears for applying a torque directly to two gears of the other gears of the plurality of gears.

13. The hand-held applicator of claim 9 further comprising a light source on the first housing in proximity to the second end of the first housing, the light source being disposed at an angle relative to an outside surface of the first housing to direct light toward the teats of an animal during a cleaning operation, the light source being aligned with the delivery port.

14. The hand-held applicator of claim 9, wherein the first portion has a plurality of gear holes and a peripherally extending flange surrounding the gear holes, and the second portion has a motor mount and a peripherally extending groove in which the flange of the first portion fits.

* * * * *